United States Patent
Ramamoorthy et al.

(10) Patent No.: US 12,439,247 B2
(45) Date of Patent: Oct. 7, 2025

(54) METHOD AND SYSTEM FOR CONTROLLING AD-HOC GROUP COMMUNICATION WITH SECURITY CONTEXT FOR MISSION CRITICAL SERVICES

(71) Applicant: SAMSUNG ELECTRONICS CO., LTD., Suwon-si (KR)

(72) Inventors: Arunprasath Ramamoorthy, Bangalore (IN); Rohini Rajendran, Bangalore (IN); Kiran Gurudev Kapale, Bangalore (IN); Basavaraj Jayawant Pattan, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 454 days.

(21) Appl. No.: 17/934,118

(22) Filed: Sep. 21, 2022

(65) Prior Publication Data

US 2023/0103760 A1    Apr. 6, 2023

(30) Foreign Application Priority Data

Sep. 21, 2021 (IN) .............................. 202141042797
Oct. 4, 2021 (IN) .............................. 202141045053
Aug. 30, 2022 (IN) .............................. 202141042797

(51) Int. Cl.
   *H04W 12/55*     (2021.01)
   *H04W 12/0431*   (2021.01)
   *H04W 84/18*     (2009.01)

(52) U.S. Cl.
   CPC ....... *H04W 12/0431* (2021.01); *H04W 12/55* (2021.01); *H04W 84/18* (2013.01)

(58) Field of Classification Search
   CPC .............................. H04W 12/04; H04W 12/55
   See application file for complete search history.

(56) References Cited

U.S. PATENT DOCUMENTS

2003/0154249 A1    8/2003 Crockett et al.
2016/0381526 A1*  12/2016 Allen ...................... H04W 4/10
                                                        709/203

(Continued)

FOREIGN PATENT DOCUMENTS

WO      2018/062940 A1      4/2018

OTHER PUBLICATIONS

International Search Report and Written Opinion of the International Searching Authority dated Feb. 23, 2023, in connection with International Application No. PCT/KR2022/014124, 8 pages.

(Continued)

*Primary Examiner* — Michael T Vu

(57) ABSTRACT

The disclosure relates to 5G/6G communication systems for supporting a higher data transmission rate. Embodiments provide a method for controlling an ad-hoc group communication with a security context for MCX services. The method includes sending, by first MC service client device 100, an ad-hoc group communication request message to an MC service server to establish the ad-hoc group communication with a second MC service client device. The MC service server determines whether the ad-hoc group communication is supported and successfully authorized based on the received ad-hoc group communication request. The method includes: receiving an ad-hoc group communication request return message from the MC service server when the ad-hoc group communication is supported and successfully authorized; generating the security context for the second MC service client device for the ad-hoc group communication; and establishing the ad-hoc group communication with the second MC service client device using the generated security context.

16 Claims, 13 Drawing Sheets

(56) References Cited

U.S. PATENT DOCUMENTS

2017/0289776 A1  10/2017  Kim et al.
2018/0167786 A1* 6/2018  Wu .................... H04W 72/04
2020/0252758 A1  8/2020  Gan et al.

OTHER PUBLICATIONS

3GPP TS 22.280 V17.6.0 (Jun. 2021) Technical Specification; 3rd Generation Partnership Project; Technical Specification Group Services and System Aspects; Mission Critical Services Common Requirements (MCCoRe); Stage 1 (Release 17); 97 pages.

3GPP TS 33.180 V17.3.0 (Jun. 2021) Technical Specification; 3rd Generation Partnership Project; Technical Specification Group Services and System Aspects; Security of the Mission Critical (MC) service; (Release 17); 204 pages.

3GPP TR 23.700-76 V1.1.0 (Jul. 2022); Technical Report; 3rd Generation Partnership Project; Technical Specification Group Services and System Aspects; Study on Ad hoc Group Communication support for Mission Critical Services; (Release 18); 35 pages.

Samsung et al., "Pseudo-CR on Solution proposal for key issue 1," 3GPP TSG-SA WG6 Meeting #47-e, S6-220444 (revision of S6-220344), e-meeting, Feb. 14-22, 2022, 11 pages.

3GPP TS 33.180 V17.6.0 (Mar. 2022); Technical Specification; 3rd Generation Partnership Project; Technical Specification Group Services and System Aspects; Security of the Mission Critical (MC) service; (Release 17); 204 pages.

3GPP TS 23.379 V18.2.0 (Jun. 2022); Technical Specification; 3rd Generation Partnership Project; Technical Specification Group Services and System Aspects; Functional architecture and information flows to support Mission Critical Push To Talk (MCPTT); Stage 2 (Release 18); 248 pages.

3GPP TS 23.280 V18.2.0 (Jun. 2022); Technical Specification; 3rd Generation Partnership Project; Technical Specification Group Services and System Aspects; Common functional architecture to support mission critical services; Stage 2; (Release 18); 320 pages.

3GPP TS 33.108 V17.0.0 (Mar. 2022); Technical Specification; 3rd Generation Partnership Project; Technical Specification Group Services and System Aspects; 3G security; Handover interface for Lawful Interception (LI) (Release 17); 360 pages.

Supplementary European Search Report dated Nov. 27, 2024, in connection with European Patent Application No. 22873173.3, 8 pages.

3GPP TS 23.179 V13.5.0 (Mar. 2017) Technical Specification, 3rd Generation Partnership Project; Technical Specification Group Services and System Aspects; Functional architecture and information flows to support mission critical communication services; Stage 2 (Release 13), 229 pages.

* cited by examiner

METHOD AND SYSTEM FOR CONTROLLING AD-HOC GROUP COMMUNICATION WITH SECURITY CONTEXT FOR MISSION CRITICAL SERVICES

CROSS-REFERENCE TO RELATED APPLICATIONS

This application is based on and claims priority under 35 U.S.C. § 119 to Indian Patent Application No. 202141042797(PS), which was filed on Sep. 21, 2021, Indian Patent Application No. 202141045053 filed on Oct. 4, 2021, and Indian Patent Application No. 202141042797 filed on Aug. 30, 2022, in the Indian Intellectual Property Office, the entire content of which are incorporated herein by reference in their entirety.

BACKGROUND

1. Field

The present disclosure relates to mission critical services, and more specifically related to a method and a system for controlling an ad-hoc group communication with a security context for Mission Critical (MCX) services.

2. Description of Related Art

Fifth generation (5G) mobile communication technologies define broad frequency bands such that high transmission rates and new services are possible, and can be implemented not only in "Sub sub 6 GHz" bands such as 3.5 GHz, but also in "Above above 6 GHz" bands referred to as mmWave including 28 GHz and 39 GHz. In addition, it has been considered to implement 6G mobile communication technologies (referred to as Beyond beyond 5G systems) in terahertz bands (for example, 95 GHz to 3 THz bands) in order to accomplish transmission rates up to fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand mobile broadband (eMBB), Ultra Reliable Low Latency Communications ultra-reliable low latency communications (URLLC), and massive Machine-Type Communications machine-type communications (mMTC), there has been ongoing standardization regarding beamforming and massive multiple-input and multiple-output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of (bandwidth part) (BWP)(BandWidth Part), new channel coding methods such as a low density parity check (LDPC) (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) (Vehicle-to-everything) for aiding driving determination by autonomous vehicles based on information regarding positions and states of vehicles transmitted by the vehicles and for enhancing user convenience, new radio unlicensed (NR-U) (New Radio Unlicensed) aimed at system operations conforming to various regulation-related requirements in unlicensed bands, NR UE Power Saving, Non-Terrestrial Network non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things industrial Internet of things (IIoT) for supporting new services through interworking and convergence with other industries, integrated access and backhaul (IAB) (Integrated Access and Backhaul) for providing a node for network service area expansion by supporting a wireless backhaul link and an access link in an integrated manner, mobility enhancement including conditional handover and dual active protocol stack (DAPS) (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization network functions virtualization (NFV) and software-defined networking Software-Defined Networking (SDN) technologies, and mobile edge computing Mobile Edge Computing (MEC) for receiving services based on UE positions.

As 5G mobile communication systems are commercialized, connected devices that have been exponentially increasing will be connected to communication networks. Accordingly, and it is accordingly expected that enhanced functions and performances of 5G mobile communication systems and integrated operations of connected devices will be necessary. To this end, new research is scheduled in connection with eXtended Reality reality (XR) for efficiently supporting augmented reality (AR), (Augmented Reality), virtual reality (VR) (Virtual Reality), mixed reality MR) (Mixed Reality) and the like, 5G performance improvement and complexity reduction by utilizing artificial intelligence Artificial Intelligence (AI) and Machine Learning machine learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as full dimensional Full Dimensional MIMO (FD-MIMO), array antennas and large-scale antennas, metamaterial-based lenses and antennas for improving coverage of terahertz band signals, high-dimensional space multiplexing technology using orbital angular momentum (OAM) (Orbital Angular Momentum), and reconfigurable intelligent surface (RIS) (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

The disclosure has been made to address at least the above-mentioned problems and/or disadvantages and to provide at least the advantages described below.

Accordingly, embodiments herein disclose a method for controlling an ad-hoc group communication with a security context for Mission Critical (MCX) services. The method includes sending, by a first MC service client device, an ad-hoc group communication request message to an MC service server to establish the ad-hoc group communication with a second MC service client device. The MC service server determines whether the ad-hoc group communication is supported and successfully authorized based on the received ad-hoc group communication request. Further, the method includes receiving, by the first MC service client device, an ad-hoc group communication request return message from the MC service server when the ad-hoc group communication is supported and successfully authorized. Further, the method includes generating, by the first MC service client device, the security context for the second MC service client device for the ad-hoc group communication. Further, the method includes establishing, by the first MC service client device, the ad-hoc group communication with the second MC service client device using the generated security context.

In an embodiment, the ad-hoc group communication request message includes a list of invited second MC service client device, an encryption supported information, a list of block sharing participants associated with the second MC service client device, an MC service group Identity (ID), an MC service client media parameter, an indication of an implicit floor request, a functional alias, a location information, an emergency indicator, and an imminent peril indicator.

In an embodiment, the ad-hoc group communication request return message includes an MC service group Identity (ID) and an authorization result information (e.g., success, failure, etc.).

In an embodiment, the security context includes an Ad-hoc Group Communication Key (AGCK) and an Ad-hoc Group Communication Key Identifier (AGCK-ID).

In an embodiment, where establishing, by the first MC service client device, the ad-hoc group communication with the second MC service client device using the generated security context includes sending, by the first MC service client device, the generated security context for the second MC service client device to the MC service server, where the generated security context sent by an Ad-hoc group communication security material request. Further, the method includes receiving, by the first MC service client device, an ad hoc group communication response from the MC service server to establish the ad-hoc group communication with the second MC service client device using the generated security context.

In an embodiment, where sending, by the first MC service client device, the generated security context for the second MC service client device to the MC service server includes encrypting, by the first MC service client device, the generated security context to a Unique identifier (UID) associated with the second MC service client device; encapsulating, by the first MC service client device, the encrypted security context for second MC service client device; and sending, by the first MC service client device, the encapsulated security context for the second MC service client device to the MC service server.

In an embodiment, the method includes determining, by the MC service server, whether the ad-hoc group communication is supported and successfully authorized based on the received ad-hoc group communication request. Further, the method includes accepting the ad-hoc group communication request in response to determining that the ad-hoc group communication is supported and successfully authorized based on the received ad-hoc group communication request, and validating a list of invited second MC service client device based on a configured limit. Further, the method includes rejecting the ad-hoc group communication request in response to determining that the ad-hoc group communication is not supported by the MC service server and not successfully authorized based on the received ad-hoc group communication request.

In an embodiment, the method includes sending, by the MC service server, the ad-hoc group communication request message along with the generated security context to the second MC service client device(s) to notify about the ad-hoc group communication, where the MC service server removes a list of block sharing participants associated with the second MC service client device(s) and an MC service group Identity (ID) list of the second MC service client device(s) that requires acknowledgment. Further, the method includes receiving, by the MC service server, an ad hoc group communication response from the second MC service client device(s) when the second MC service client device(s) accepts the ad-hoc group communication request message, where the ad hoc group communication response includes a functional alias of responding second MC service client device(s). Further, the method includes determining, by the MC service server, whether the received ad hoc group communication response receives within the configured time. Further, the method includes abandoning the ad-hoc group communication in response to determining that the received ad hoc group communication response does not receive within the configured time. Further, the method includes sending the received ad hoc group communication response to the first MC service client device to establish the ad-hoc group communication with the second MC service client device(s) using the generated security context in response to determine that the received ad hoc group communication response receives within the configured time.

The ad-hoc group communication includes one or more preconditions, the MC service server authorizes the first MC service client device and the authorized first MC service client device invites the second MC service client device(s) to establish the ad-hoc group communication, the second MC service client device(s) is invited for the ad-hoc group communication within limits of a non-pre-configured method, the ad-hoc group communication supports end-to-end encryption, and the authorized first MC service client device has the security context for the second MC service client device(s) for the ad-hoc group communication.

Accordingly, embodiments herein disclose a method for controlling the ad-hoc group communication with the security context for the MCX services. The method includes detecting, by the MC service server, ongoing ad-hoc group communication between the first MC service client device and the second MC service client device(s). Further, the method includes receiving, by the MC service server, a modify ad-hoc group call participants request message from the first MC service client device, where the modify ad-hoc group call participants request message includes a modification information (e.g., add, remove, re-join, etc.). Further, the method includes determining, by the MC service server, whether the first MC service client device is authorized to modify a participant list of the detected ongoing ad-hoc group communication (or said whether the first MC service client device or any other MC service client device participating in the ad hoc group communication is authorized or not to modify the participant list can be an entry in the respective user profile configuration data of the MC service clients). Further, the method includes modifying, by the MC service server, the participant list based on the received modification information by performing an action(s). Further, the method includes notifying, by the MC service server, the modified participant list of the second MC service client device(s) to the first MC service client device and/or the second MC service client device(s) of the modified participant list.

In an embodiment, the modification information indicates a removal of the second MC service client device(s) from the detected ongoing ad-hoc group communication and/or addition of a new MC service client device into the detected ongoing ad-hoc group communication.

In an embodiment, where modifying, by the MC service server, the participant list based on the received modification information includes sending, by the MC service server, an ad-hoc group communication leave request to the second MC service client device(s) based on the modification information to remove the second MC service client device(s) from the detected ongoing ad-hoc group communication. Further, the method includes receiving, by the MC service server, an ad-hoc group call leave response from a modified second MC service client device(s). Further, the method includes removing, by the MC service server, the modified second MC service client device(s) from the detected ongoing ad-hoc group communication upon receiving the ad-hoc group call leave response.

In an embodiment, where modifying, by the MC service server, the participant list based on the received modification information includes sending, by the MC service server, an ad-hoc group call communication request to a new MC service client device based on the modification information to add the new MC service client device into the detected ongoing ad-hoc group communication, where the ad-hoc group call communication request includes a security context for new MC service client device, an ad-hoc group identity of the detected ongoing ad-hoc group communication, and a session identity. Further, the method includes receiving, by the MC service server, an ad-hoc group communication response from the new MC service client device. Further, the method includes adding, by the MC service server, the new MC service client device into the detected ongoing ad-hoc group communication.

In an embodiment, where the action includes rejoining, by the MC service server, the first MC service client device in the detected ongoing ad-hoc group communication; rejoining, by the MC service server, the second MC service client device(s) in the detected ongoing ad-hoc group communication; and releasing, by the MC service server, the detected ongoing ad-hoc group communication.

Accordingly, the embodiments herein provide the first MC service client device for controlling the ad-hoc group communication with the security context for the MCX services. The first MC service client device includes an ad-hoc group controller coupled with a processor and a memory. The ad-hoc group controller sends the ad-hoc group communication request message to the MC service server to establish the ad-hoc group communication with the second MC service client device(s), where the MC service server determines whether the ad-hoc group communication is supported and successfully authorized based on the received ad-hoc group communication request. Further, the ad-hoc group controller receives the ad-hoc group communication request return message from the MC service server when the ad-hoc group communication is supported and successfully authorized. Further, the ad-hoc group controller generates the security context for the second MC service client device(s) for the ad-hoc group communication. Further, the ad-hoc group controller establishes the ad-hoc group communication with the second MC service client device(s) using the generated security context.

Accordingly, the embodiments herein provide the MC service server for controlling the ad-hoc group communication with the security context for the MCX services. The MC service server includes an ad-hoc group controller coupled with a processor and a memory. The ad-hoc group controller receives the ad-hoc group communication request message from the first MC service client device to establish the ad-hoc group communication with the second MC service client device(s). Further, the ad-hoc group controller determines whether the ad-hoc group communication is supported and successfully authorized based on the received ad-hoc group communication request. Further, the ad-hoc group controller accepts the ad-hoc group communication request in response to determining that the ad-hoc group communication is supported and successfully authorized based on the received ad-hoc group communication request, and validating the list of invited second MC service client device based on the configured limit. Further, the ad-hoc group controller rejects the ad-hoc group communication request in response to determining that the ad-hoc group communication is not supported by the MC service server and is not successfully authorized based on the received ad-hoc group communication request. Further, the ad-hoc group controller receives the security context for the second MC service client device(s) for the ad-hoc group communication.

Accordingly, the embodiments herein provide the MC service server for controlling the ad-hoc group communication with the security context for the MCX services. The MC service server includes the ad-hoc group controller coupled with the processor and the memory. The ad-hoc group controller detects the ongoing ad-hoc group communication between the first MC service client device and the second MC service client device(s). Further, the ad-hoc group controller receives the modify ad-hoc group call participants request message from the first MC service client device, where the modify ad-hoc group call participants request message includes the modification information. Further, the ad-hoc group controller determines whether the first MC service client device is authorized to modify the participant list of the detected ongoing ad-hoc group communication. Further, the ad-hoc group controller modifies the participant list based on the received modification information by performing the action. Further, the ad-hoc group controller notifies the modified participant list of the second MC service client device(s) to the first MC service client device and/or the second MC service client device(s) of the modified participant list.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein, and the embodiments herein include all such modifications.

BRIEF DESCRIPTION OF THE DRAWINGS

This disclosure is illustrated in the accompanying drawings, throughout which like reference letters indicate corresponding parts in the various figures. The embodiments herein will be better understood from the following description with reference to the drawings, in which.

DETAILED DESCRIPTION

Figure 1A:
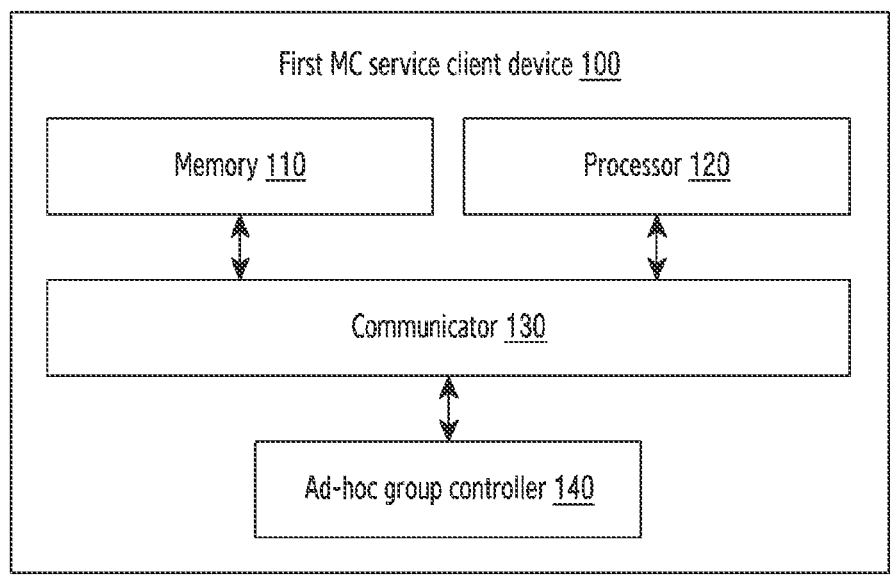
FIG. 1A illustrates a block diagram of a first MC service client device for controlling an ad-hoc group communication with a security context for Mission Critical (MCX) services, according to an embodiment of disclosure.

Hereinafter, embodiments of the disclosure will be described in detail with reference to the accompanying drawings. In the disclosure, embodiments are described in the drawings and a related detailed description is set forth, but this is not intended to limit the embodiments of the disclosure. Descriptions of well-known functions and constructions are omitted for the sake of clarity and conciseness.

The term couple refers to any direct or indirect communication between two or more elements, whether or not those elements are in physical contact with one another. The terms transmit, receive, and communicate encompass both direct and indirect communication. The terms include and comprise, mean inclusion without limitation. The term or is inclusive, meaning and/or. The term controller means any device, system or part thereof that controls at least one operation. A controller can be implemented in hardware or a combination of hardware and software and/or firmware. The functionality associated with any particular controller can be centralized or distributed, whether locally or remotely. At least one of, when used with a list of items, means that different combinations of one or more of the listed items can be used, and only one item in the list can be needed. For example, at least one of A, B, and C includes any of the following combinations: A, B, and C; A and B; A and C; B and C; and A and B and C. For example, at least one of A, B, or C includes any of the following combinations: A, B, and C; A and B; A and C; B and C; and A and B and C.

Moreover, various functions described below can be implemented or supported by one or more computer programs, each of which is formed from computer readable program code and embodied in a computer readable medium. The terms application and program refer to one or more computer programs, software components, sets of instructions, procedures, functions, objects, classes, instances, related data, or a portion thereof adapted for implementation in a suitable computer readable program code. The phrase computer readable program code includes any type of computer code, including source code, object code, and executable code. The phrase computer readable medium includes any type of medium capable of being accessed by a computer, such as read-only memory (ROM), random access memory (RAM), a hard disk drive, a compact disc (CD), a digital video disc (DVD), or any other type of memory. A non-transitory computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Terms used herein to describe the embodiments of the present disclosure are not intended to limit and/or define the scope of the present disclosure. For example, unless otherwise defined, the technical terms or scientific terms used in the present disclosure shall have the ordinary meaning understood by those with ordinary skills in the art to which the present disclosure belongs.

It should be understood that first, second and similar words used in the present disclosure do not express any order, quantity or importance, but are only used to distinguish different components. Unless otherwise indicated by the context clearly, similar words such as "a," "an," or "the" in a singular form do not express a limitation of quantity, but express an existence of at least one.

As used herein, any reference to one example or example, one embodiment or embodiment means that particular elements, features, structures or characteristics described in connection with the embodiment are included in at least one embodiment. The phrases in one embodiment or in one example appearing in different places of the disclosure do not necessarily refer to the same embodiment.

The various embodiments discussed below for describing the principles of the present disclosure are for illustration only and should not be interpreted as limiting the scope of the present disclosure in any way. Those skilled in the art will understand that the principles of the present disclosure can be implemented in any suitably arranged wireless communication system. For example, although the following detailed description of the embodiments of the present disclosure will be directed to LTE and 5G communication system, those skilled in the art can understand that the main points of the present disclosure can also be applied to other communication systems with similar technical backgrounds and channel formats with slight modifications without departing from the scope of the present disclosure. For example, the communication systems may include a global system for mobile communications (GSM) system, code division multiple access (CDMA) system, wideband code division multiple access (WCDMA) system, general packet radio service (GPRS), long term evolution (LTE) system, LTE frequency division duplex (FDD) system, LTE time division duplex (TDD), UMTS, worldwide interoperability for microwave access (WiMAX) communication system, a 5G system or new radio (NR), etc. In addition, the technical schemes of the embodiments of the application can be applied to future-oriented communication technologies.

According to existing 3GPP Technical Specifications (TS) 23.280 and TS 23.379, an MCX user performs a group call by merging existing two or more pre-configured groups or by selecting a list of users who may be invited for the group call. This functionality requires creation of a new temporary group, either at a Group Management server or an MCX server prior to making a group call to that group. The newly created temporary group remains on the group management server or the MCX server until the MCX user deletes it. No procedure in the existing 3GPP specifications allows the MCX user to select the list of users and perform an MCX operation (e.g., ad-hoc group communication, a Mission-Critical Push-To-Talk (MCPTT) call, MC-Video call, or MCData related operation) without first creating the new temporary group.

In addition, some existing systems use a pre-configured group mechanism to achieve end-to-end encryption for the MCX operation. However, the pre-configured group mechanism has a drawback in that any member of the pre-configured group can eavesdrop or decrypt media even if they are not participants in the ad-hoc group communication.

Thus, it is desired to address the above-mentioned disadvantages or other shortcomings or at least provide a useful alternative for controlling the ad-hoc group communication with a security context for Mission Critical (MCX) services/MCX operation.

The principal object of the embodiments herein is to provide a method for controlling an ad-hoc group communication with a security context for Mission Critical (MCX) services. Where an MCX user (e.g., MC client/call initiator) selects a random group of MCX users to initiate the ad-hoc group communication and communicates with them without using a pre-configured group. The MCX user does not have to worry about whether other MCX users (e.g., MCX participants) have the pre-configured group provisioned in a UE or not with this proposed mechanism.

Another object of the embodiment herein is to generate, by the MCX user (e.g., call initiator) of the ad-hoc group communication, the security context to be used for the ad-hoc group communication and shared with other MCX users (e.g., participants) of the communication in an encrypted way. With this mechanism, the MCX user does not have to worry about whether other MCX users have the pre-configured group provisioned in their UE or not. The security material for the ad-hoc group communication is available only to the participants of a call as opposed to the existing pre-configured group mechanism where any MCX users of the pre-configured group can eavesdrop or able to decrypt a media even if they are not participants of the ad-hoc group communication.

Another object of the embodiment herein is to remove the participants from an ongoing ad-hoc group communication.

Another object of the embodiment herein is to provide information flows required between the MC client and MC servers for supporting the ad-hoc group communication.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure The accompanying drawings are used to help easily understand various technical features and it should be understood that the embodiments presented herein are not limited by the accompanying drawings. As such, the present disclosure should be construed to extend to any alterations, equivalents, and substitutes in addition to those which are particularly set out in the accompanying drawings. Although the terms first, second, etc. may be used herein to describe various elements, these elements should not be limited by these terms. These terms are generally only used to distinguish one element from another.

Accordingly, embodiments herein disclose a method for controlling an ad-hoc group communication with a security context for Mission Critical (MCX) services. The method includes sending, by a first MC service client device, an ad-hoc group communication request message to an MC service server to establish the ad-hoc group communication with a second MC service client device(s). The MC service server determines whether the ad-hoc group communication is supported and successfully authorized based on the received ad-hoc group communication request. Further, the method includes receiving, by the first MC service client device, an ad-hoc group communication request return message from the MC service server when the ad-hoc group communication is supported and successfully authorized. Further, the method includes generating, by the first MC service client device, the security context for the second MC service client device(s) for the ad-hoc group communication. Further, the method includes establishing, by the first MC service client device, the ad-hoc group communication with the second MC service client device(s) using the generated security context.

Accordingly, embodiments herein disclose a method for controlling the ad-hoc group communication with the security context for the MCX services. The method includes detecting, by the MC service server, ongoing ad-hoc group communication between the first MC service client device and the second MC service client device(s). Further, the method includes receiving, by the MC service server, a modify ad-hoc group call participants request message from the first MC service client device, where the modify ad-hoc group call participants request message includes a modification information (e.g., add, remove, re-join, etc.). Further, the method includes determining, by the MC service server, whether the first MC service client device is authorized to modify a participant list of the detected ongoing ad-hoc group communication (or said whether the first MC service client device or any other MC service client device participating in the ad hoc group communication is authorized or not to modify the participant list can be an entry in the respective user profile configuration data of the MC service clients). Further, the method includes modifying, by the MC service server, the participant list based on the received modification information by performing an action(s). Further, the method includes notifying, by the MC service server, the modified participant list of the second MC service client device(s) to the first MC service client device and/or the second MC service client device(s) of the modified participant list.

Accordingly, the embodiments herein provide the first MC service client device for controlling the ad-hoc group communication with the security context for the MCX services. The first MC service client device includes an ad-hoc group controller coupled with a processor and a memory. The ad-hoc group controller sends the ad-hoc group communication request message to the MC service server to establish the ad-hoc group communication with the second MC service client device(s), where the MC service server determines whether the ad-hoc group communication is supported and successfully authorized based on the received ad-hoc group communication request. Further, the ad-hoc group controller receives the ad-hoc group communication request return message from the MC service server when the ad-hoc group communication is supported and successfully authorized. Further, the ad-hoc group controller generates the security context for the second MC service client device(s) for the ad-hoc group communication. Further, the ad-hoc group controller establishes the ad-hoc group communication with the second MC service client device(s) using the generated security context.

Accordingly, the embodiments herein provide the MC service server for controlling the ad-hoc group communication with the security context for the MCX services. The MC service server includes an ad-hoc group controller coupled with a processor and a memory. The ad-hoc group controller receives the ad-hoc group communication request message from the first MC service client device to establish the ad-hoc group communication with the second MC service client device(s). Further, the ad-hoc group controller determines whether the ad-hoc group communication is supported and successfully authorized based on the received ad-hoc group communication request. Further, the ad-hoc group controller accepts the ad-hoc group communication request in response to determining that the ad-hoc group communication is supported and successfully authorized based on the received ad-hoc group communication request, and validating the list of invited second MC service client device based on the configured limit. Further, the ad-hoc group controller rejects the ad-hoc group communication request in response to determining that the ad-hoc group communication is not supported by the MC service server and is not successfully authorized based on the received ad-hoc group communication request. Further, the ad-hoc group controller receives the security context for the second MC service client device(s) for the ad-hoc group communication.

Accordingly, the embodiments herein provide the MC service server for controlling the ad-hoc group communication with the security context for the MCX services. The MC service server includes the ad-hoc group controller coupled with the processor and the memory. The ad-hoc group controller detects the ongoing ad-hoc group communication between the first MC service client device and the second MC service client device(s). Further, the ad-hoc group controller receives the modify ad-hoc group call participants request message from the first MC service client device, where the modify ad-hoc group call participants request message includes the modification information. Further, the ad-hoc group controller determines whether the first MC service client device is authorized to modify the participant list of the detected ongoing ad-hoc group communication. Further, the ad-hoc group controller modifies the participant list based on the received modification information by performing the action. Further, the ad-hoc group controller notifies the modified participant list of the second MC service client device(s) to the first MC service client device and/or the second MC service client device(s) of the modified participant list.

Unlike existing methods and systems, the proposed method controls the ad-hoc group communication with the security context for Mission Critical (MCX) services. Where an MCX user (e.g., MC client/call initiator/first MC service client device) selects a random group of MCX users (e.g., one or more second MC service client device(s)/other MCX users/participants) to initiate the ad-hoc group communication and communicates with them without using a pre-configured group. The MCX user does not have to worry about whether other MCX users (e.g., MCX participants) have the pre-configured group provisioned in their UE or not with this proposed mechanism.

Unlike existing methods and systems, the proposed method allows the MCX user (e.g., call initiator) of the ad-hoc group communication to generate the security context to be used for the ad-hoc group communication and shared with other MCX users (e.g., participants) of the communication in an encrypted way. With this mechanism, the MCX user does not have to worry about whether other MCX users have the pre-configured group provisioned in their UE or not. The security material for the ad-hoc group communication is available only to the participants of a call as opposed to the existing pre-configured group mechanism where any MCX users of the pre-configured group can eavesdrop or able to decrypt a media even if they are not participants of the ad-hoc group communication.

Unlike existing methods and systems, the proposed method allows the first MC service client device and/or MC service server to remove the participants from the ongoing ad-hoc group communication.

Unlike existing methods and systems, the proposed method provides information flows required between the MC client and MC servers for supporting the ad-hoc group communication.

Referring now to the drawings, and more particularly to FIGS. 1A through 10, where similar reference characters denote corresponding features consistently throughout the figures, there are shown preferred embodiments.

FIG. 1A illustrates a block diagram of a first MC service client device 100 for controlling an ad-hoc group communication with a security context for Mission Critical (MCX) services, according to an embodiment of disclosure. Examples of the first MC service client device 100 and one or more second MC service client devices 300 include, but are not limited to a smartphone, a User Equipment (UE), a tablet computer, a Personal Digital Assistance (PDA), an Internet of Things (IoT) device, a wearable device, etc.

In an embodiment, the first MC service client device 100 includes a memory 110, a processor 120, a communicator 130, and an ad-hoc group controller 140.

In an embodiment, the memory 110 stores information related to various communication messages (e.g., ad-hoc group communication request) and a security context. The memory 110 stores instructions to be executed by the processor 120. The memory 110 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 110 may, in some examples, be considered a non-transitory storage medium. The term "non-transitory" may indicate that the storage medium is not embodied in a carrier wave or a propagated signal. However, the term "non-transitory" should not be interpreted that the memory 110 is non-movable. In some examples, the memory 110 can be configured to store larger amounts of information than the memory. In certain examples, a non-transitory storage medium may store data that can, over time, change (e.g., in Random Access Memory (RAM) or cache). The memory 110 can be an internal storage unit or it can be an external storage unit of the first MC service client device 100, a cloud storage, or any other type of external storage.

The processor 120 communicates with the memory 110, the communicator 130, and the ad-hoc group controller 140. The processor 120 is configured to execute instructions stored in the memory 110 and to perform various processes. The processor 120 may include one or a plurality of processors, maybe a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator 130 is configured for communicating internally between internal hardware components and with external devices (e.g. eNodeB, gNodeB, server, etc.) via one or more networks (e.g. Radio technology). The communicator 130 includes an electronic circuit specific to a standard that enables wired or wireless communication.

The ad-hoc group controller 140 is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In addition, the operation of the ad-hoc group controller 140 may be performed by the processor 120. For example, the first MC service client device 100 may include the processor 120 and the communicator 130 and may not include the ad-hoc group controller 140, and the processor 120 may be configured to perform the operations of the ad-hoc group controller 140. That is, the ad-hoc group controller 140 is replaced by the processor 120.

In an embodiment, the ad-hoc group controller 140 sends an ad-hoc group communication request message to an MC service server 200 to establish the ad-hoc group communication with the second MC service client device(s) 300 (or one or more second MC service client device (300A, 300B, 300C, etc.)), where the MC service server 200 determines whether the ad-hoc group communication is supported and successfully authorized based on the received ad-hoc group communication request. The ad-hoc group communication request message includes a list of invited second MC service client device 300, an encryption supported information, a list of block sharing participants associated with the second MC service client device 300, an MC service group Identity (ID), an MC service client media parameter, an indication of an implicit floor request, a functional alias, a location information, an emergency indicator, and an imminent peril indicator.

The ad-hoc group controller 140 receives an ad-hoc group communication request return message from the MC service server 200 when the ad-hoc group communication is supported and successfully authorized. The ad-hoc group communication request return message includes an MC service group Identity (ID) and an authorization result information (e.g., failure, success, etc.)

The ad-hoc group controller 140 generates the security context for the second MC service client device(s) 300 for the ad-hoc group communication. The security context includes an Ad-hoc Group Communication Key (AGCK) and an Ad-hoc Group Communication Key Identifier (AGCK-ID). The ad-hoc group controller 140 encrypts the generated security context to a Unique identifier (UID) associated with the second MC service client device(s) 300. The ad-hoc group controller 140 encapsulates the encrypted security context for the second MC service client device(s) 300. The ad-hoc group controller 140 sends the encapsulated security context for the second MC service client device(s) 300 to the MC service server 200, where the generated security context is sent by an Ad-hoc group communication security material request. The ad-hoc group controller 140 receives an ad hoc group communication response from the MC service server 200 to establish the ad-hoc group communication with the second MC service client device(s) 300 using the generated security context. The ad-hoc group controller 140 establishes the ad-hoc group communication with the second MC service client device(s) 300 using the generated security context.

Although the FIG. 1A shows various hardware components of the first MC service client device 100 but it is to be understood that other embodiments are not limited thereon. In other embodiments, the first MC service client device 100 may include less or more number of components. Further, the labels or names of the components are used only for illustrative purpose and does not limit the scope of the disclosure. One or more components can be combined to perform the same or substantially similar function to control the ad-hoc group communication with the security context for the MCX services (e.g., call).

Figure 1B:
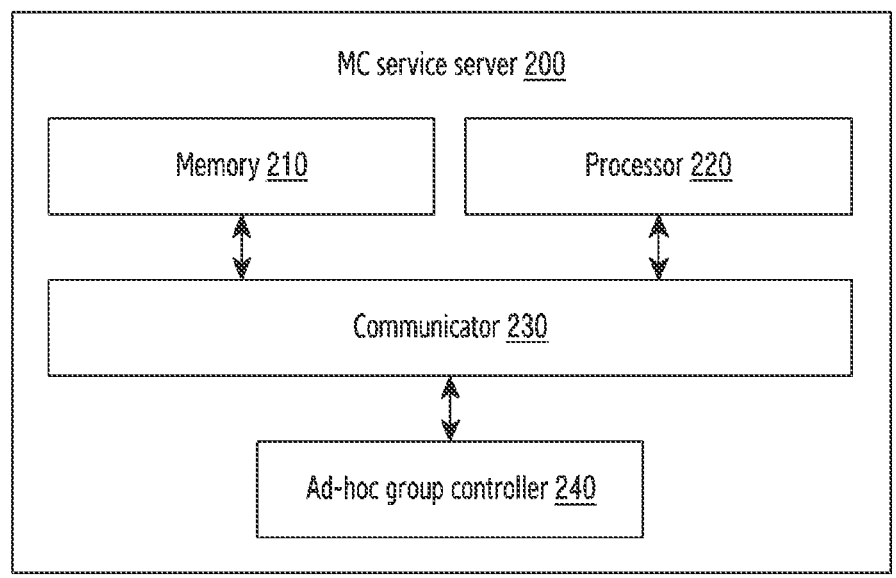
FIG. 1B illustrates a block diagram of an MC service server for controlling the ad-hoc group communication with the security context for the MCX services, according to an embodiment of disclosure.

FIG. 1B illustrates a block diagram of the MC service server 200 (e.g., MCPTT server) for controlling the ad-hoc group communication with the security context for the MCX services, according to an embodiment of disclosure.

In an embodiment, the MC service server 200 includes a memory 210, a processor 220, a communicator 230, and an ad-hoc group controller 240.

In an embodiment, the memory 210 stores information relates to various communication messages (e.g., ad-hoc group communication request) and the security context. The memory 210 stores instructions to be executed by the processor 220. The memory 210 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 210 may, in some examples, be considered a non-transitory storage medium. The term "non-transitory" may indicate that the storage medium is not embodied in a carrier wave or a propagated signal. However, the term "non-transitory" should not be interpreted that the memory 210 is non-movable. In some examples, the memory 210 can be configured to store larger amounts of information than the memory. In certain examples, a non-transitory storage medium may store data that can, over time, change (e.g., in Random Access Memory (RAM) or cache). The memory 210 can be an internal storage unit or it can be an external storage unit of the MC service server 200, a cloud storage, or any other type of external storage.

The processor 220 communicates with the memory 210, the communicator 230, and the ad-hoc group controller 240. The processor 220 is configured to execute instructions stored in the memory 210 and to perform various processes. The processor 220 may include one or a plurality of processors, maybe a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator 230 is configured for communicating internally between internal hardware components and with external devices (e.g. first MC service client device 100, one or more second MC service client device(s) 300, server, etc.) via one or more networks (e.g. Radio technology). The communicator 230 includes an electronic circuit specific to a standard that enables wired or wireless communication.

The ad-hoc group controller 240 is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In addition, the operation of the ad-hoc group controller 240 may be performed by the processor 220. For example, the MC service server 200 may include the processor 220 and the communicator 230 and may not include the ad-hoc group controller 240, and the processor 220 may be configured to perform the operations of the ad-hoc group controller 240. That is, the ad-hoc group controller 240 is replaced by the processor 220.

In an embodiment, the ad-hoc group controller 240 receives the ad-hoc group communication request message from the first MC service client device 100 to establish the ad-hoc group communication with the second MC service client device(s) 300. The ad-hoc group controller 240 determines whether the ad-hoc group communication is supported and successfully authorized based on the received ad-hoc group communication request. The ad-hoc group controller 240 accepts the ad-hoc group communication request in response to determining that the ad-hoc group communication is supported and successfully authorized based on the received ad-hoc group communication request, and validating a list of invited second MC service client device based on a configured limit. The ad-hoc group controller 240 rejects the ad-hoc group communication request in response to determining that the ad-hoc group communication is not supported by the MC service server 200 and is not successfully authorized based on the received ad-hoc group communication request. The ad-hoc group controller 240 receives the security context for the second MC service client device(s) 300 for the ad-hoc group communication.

The ad-hoc group controller 240 sends the ad-hoc group communication request message along with the generated security context to the second MC service client device(s) 300 to notify about the ad-hoc group communication, where the MC service server 200 removes a list of block sharing participants associated with the second MC service client device(s) 300 and an MC service group Identity (ID) list of the second MC service client device(s) 300 that requires acknowledgment. The ad-hoc group controller 240 receives an ad hoc group communication response from the second MC service client device(s) 300 when the second MC service client device(s) 300 accepts the ad-hoc group communication request message, where the ad hoc group communication response includes a functional alias of responding second MC service client device(s) 300.

The ad-hoc group controller 240 determines whether the received ad hoc group communication response receives within a configured time. The ad-hoc group controller 240 abandons the ad-hoc group communication in response to determining that the received ad hoc group communication response does not receive within the configured time. The ad-hoc group controller 240 sends the received ad hoc group communication response to the first MC service client device 100 to establish the ad-hoc group communication with the second MC service client device(s) 300 using the generated security context in response to determine that the received ad hoc group communication response receives within the configured time.

The ad-hoc group controller 240 detects ongoing ad-hoc group communication between the first MC service client device 100 and the second MC service client device(s) 300. The ad-hoc group controller 240 receives a modify ad-hoc group call participants request message from the first MC service client device 100, where the modify ad-hoc group call participants request message includes a modification information. The modification information indicates a removal of the second MC service client device(s) 300 from the detected ongoing ad-hoc group communication and/or addition of a new MC service client device into the detected ongoing ad-hoc group communication.

The ad-hoc group controller 240 determines whether the first MC service client device 100 is authorized to modify a participant list of the detected ongoing ad-hoc group communication. The ad-hoc group controller 240 modifies the participant list based on the received modification information by performing an action(s) (e.g., add/remove/re-join, etc.). The ad-hoc group controller 240 notifies the modified participant list of the second MC service client device(s) 300 to the first MC service client device 100 and/or the second MC service client device(s) 300 of the modified participant list.

The ad-hoc group controller 240 sends an ad-hoc group communication leave request to the second MC service client device(s) 300 based on the modification information to remove the second MC service client device(s) 300 from the detected ongoing ad-hoc group communication. The ad-hoc group controller 240 receives an ad-hoc group call leave response from the modified second MC service client device(s) 300. The ad-hoc group controller 240 removes the modified second MC service client device(s) 300 from the detected ongoing ad-hoc group communication upon receiving the ad-hoc group call leave response.

The ad-hoc group controller 240 sends an ad-hoc group call communication request to a new MC service client device based on the modification information to add the new MC service client device into the detected ongoing ad-hoc group communication, where the ad-hoc group call communication request includes a security context for new MC service client device, an ad-hoc group identity of the detected ongoing ad-hoc group communication, and a session identity. The ad-hoc group controller 240 receives an ad-hoc group communication response from the new MC service client device. The ad-hoc group controller 240 adds the new MC service client device into the detected ongoing ad-hoc group communication. The ad-hoc group controller 240 adds/removes/re-joins the first MC service client device 100 and/or the second MC service client device(s) 300 in the detected ongoing ad-hoc group communication. The ad-hoc group controller 240 releases the detected ongoing ad-hoc group communication.

Although the FIG. 1B shows various hardware components of the MC service server 200 but it is to be understood that other embodiments are not limited thereon. In other embodiments, the MC service server 200 may include less or more number of components. Further, the labels or names of the components are used only for illustrative purpose and does not limit the scope of the disclosure. One or more components can be combined to perform the same or substantially similar function to control the ad-hoc group communication with the security context for the MCX services (e.g., call).

Figure 2:
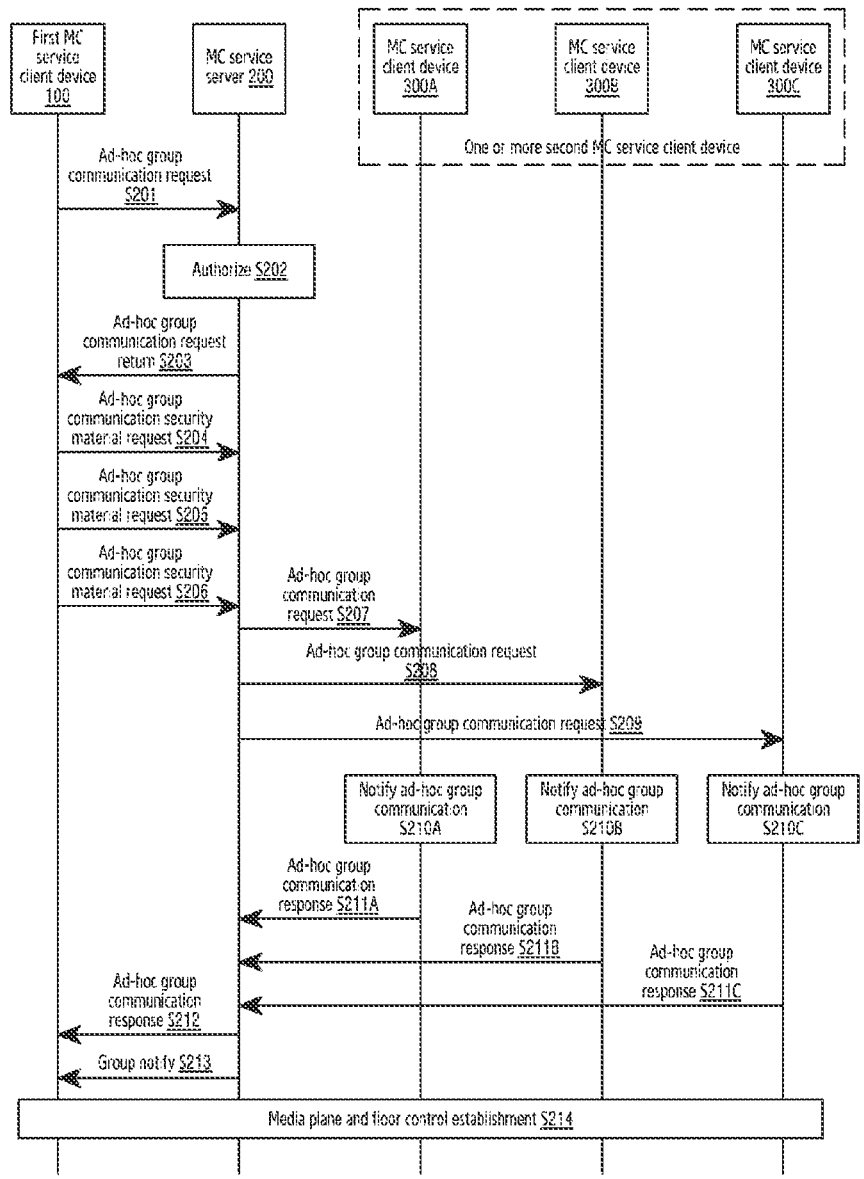
FIG. 2 illustrates a sequence diagram for initiating an ad-hoc group call setup using a non-pre-configured approach, according to an embodiment of disclosure.

FIG. 2 illustrates a sequence diagram for initiating an ad-hoc group call setup using a non-pre-configured approach, according to an embodiment of disclosure.

Pre-Condition for the Ad-Hoc Group Call Setup:
i. The authorized user at the first MC service client device 100 wants to invite other MC service users at one or more second MC service client devices (300A, 300B, 300C) for the ad-hoc group communication;

ii. A number of participants being invited for the communication are within the limit for the non-pre-configured method/approach;
iii. End-to-End encryption is supported for this ad-hoc group communication; and
iv. The first MC service client device 100 has all the security-related information required to communicate with the participants (e.g., one or more second MC service client devices (300A, 300B, 300C)) of the ad-hoc group communication.

At step S201, the user (e.g., MC service user) at the first MC service client device 100 may like to initiate the ad-hoc group communication. The first MC service client device 100 initiates the ad-hoc group communication by sending the ad-hoc group communication request containing the list of participants to the MC service server 200. Encryption supported information element may be set to true since end-to-end encryption is supported. The ad-hoc group communication request may also contain block sharing participants list indicator information element set to true if the originating user (e.g., the first MC service client device 100) (i.e., first MC service client device 100) wants to suppress sharing of the participant's list to other users (e.g., one or more second MC service client device (300A, 300B, 300C)). The ad-hoc group communication request may include the MC service group ID that is created by the first MC service client device 100 or not include the MC service group ID that allows the MC service server 200 to assign one for use. An SDP offer containing the MC service client media parameters is included. If there is a floor request to transmit, then the ad-hoc group communication request contains the indication of the implicit floor request. If the MC service user of the first MC service client device 100 has selected the functional alias, then the ad-hoc group communication request contains that functional alias. If the ad-hoc group communication request contains the implicit floor request it may also include the location information.

If the MC service user at the first MC service client device 100 initiates an MC service emergency ad-hoc group communication or the MC service emergency state is already set for the first MC service client device 100 (due to a previously triggered MC service emergency alert):
i. The MC service ad-hoc group communication request may contain the emergency indicator; and
ii. If the MC service emergency state is not set already, the first MC service client device 100 sets its MC service emergency state. The MC service emergency state of the first MC service client device 100 is retained until explicitly canceled by the user of the first MC service client device 100.

At step S202, the MC service server 200 accepts the ad-hoc group communication request if the ad-hoc group communication is supported and authorized. Otherwise reject the ad-hoc group communication request and do not continue with the rest of the steps (e.g., S203-S214). If authorized, the MC service server 200 validates whether the number of invited participants is within the configured limit before proceeding with the communication setup (e.g., S203-S214):
i. If the functional alias is present, the MC service server 200 checks whether the provided functional alias is allowed to be used and has been activated for the user;
ii. If the location information was included in the ad-hoc group communication request, the MC service server 200 checks the privacy policy of the MC service user to decide if the location information of the first MC service client device 100 can be provided to other users on the communication;

iii. If the emergency indicator is present in the received MC service ad-hoc group communication request, the MC service ad-hoc group is considered to be in an in-progress emergency state until this ad-hoc group communication is terminated; and iv. If the imminent peril indicator is present in the received MC service ad hoc group communication request, the MC service ad-hoc group is considered to be in the in-progress imminent peril state until this ad-hoc group communication is terminated.

The MC service server 200 considers the ad hoc group communication participants as implicitly affiliated with the ad-hoc group.

At step S203, the MC service server 200 sends the ad-hoc group communication request return message to the first MC service client device 100 containing the below:

i. The MC service ad-hoc group ID (e.g., either provided by the first MC service client device 100 which is acceptable to the MC service server 200 or generated by the MC service server 200 in the case where the MC service ad-hoc group ID created by the first MC service client device 100 is not acceptable or the case where the MC service ad-hoc group ID was not provided by the first MC service client device 100); and ii. Result of whether the ad-hoc group communication is authorized or not (e.g., successful or failure). If the ad-hoc group communication request is not authorized, the first MC service client device 100 may not proceed with the rest of the steps (e.g., S204-S214).

At steps S204 to S206, the first MC service client device 100 sends the security context (e.g., ad-hoc group communication security material) request targeting each of the participants containing the security material to be shared with the participants for use in the ad-hoc group communication. If end-to-end encryption is not supported, then the ad-hoc group communication security material requests are not sent.

At steps S207 to S209, the MC service server 200 sends the ad-hoc group communication requests towards the MC service clients (e.g., one or more second MC service client devices (300A, 300B, 300C)) of the invited users based on step S201. While sending the ad-hoc group communication requests, the MC service server 200 removes information elements that are not required to be conveyed to the target MC service clients/one or more second MC service client devices (300A, 300B, 300C) (e.g., Block sharing participants list indicator, MC service ID list of the users who are required to acknowledge).

At steps S210A to S210C, the receiving MC service clients (e.g., one or more second MC service client devices (300A, 300B, 300C)) are notified about the incoming ad-hoc group communication. At steps S211A to S211C, the receiving MC service clients accept the ad-hoc group communication requests and send the ad-hoc group communication response(s) to the MC service server 200. The response may also contain the functional alias of the responding MC service user (e.g., one or more second MC service client device (300A, 300B, 300C)), which is verified (valid and activated for the user) by the MC service server 200. At step S212, the MC service server 200 sends the ad-hoc group communication response to the first MC service client device 100 through the signalling path to inform about successful communication establishment. Steps S207 to step S211C can start to occur before all steps S204 to S206 are completed since the MC service server 200 does not require waiting for the previous ad-hoc group communication request to complete before sending the ad-hoc group request to another participant.

At step S213, if the initiating MC service user (e.g., first MC service client device 100) requires an acknowledgement from the invited MC service users (e.g.,) one or more second MC service client device 300A, 300B, 300C, and the required MC service users (e.g., one or more second MC service client device 300A, 300B, 300C) do not acknowledge the communication setup within the configured time ("acknowledged communication setup timeout"), then the MC service server 200 may proceed with or abandon the communication and then notify the initiating MC service user that the acknowledgements did not include all required members according to ad-hoc group communication policy from a user profile configuration. The MC service server 200 may notify the initiating MC service user of all MC service users who did not acknowledge the ad-hoc group communication request within the configured time. This notification may be sent to the initiating MC service user by the MC service server 200 more than once during the communication when the MC service users join or leave the MC service ad-hoc group communication. At step S214, the first MC service client device 100 and one or more second MC service client devices 300A, 300B, 300C establish a media plane and floor control resources. Step S214 can occur any time following step SS212 if the conditions to proceed with the communication are met.

Figure 3:
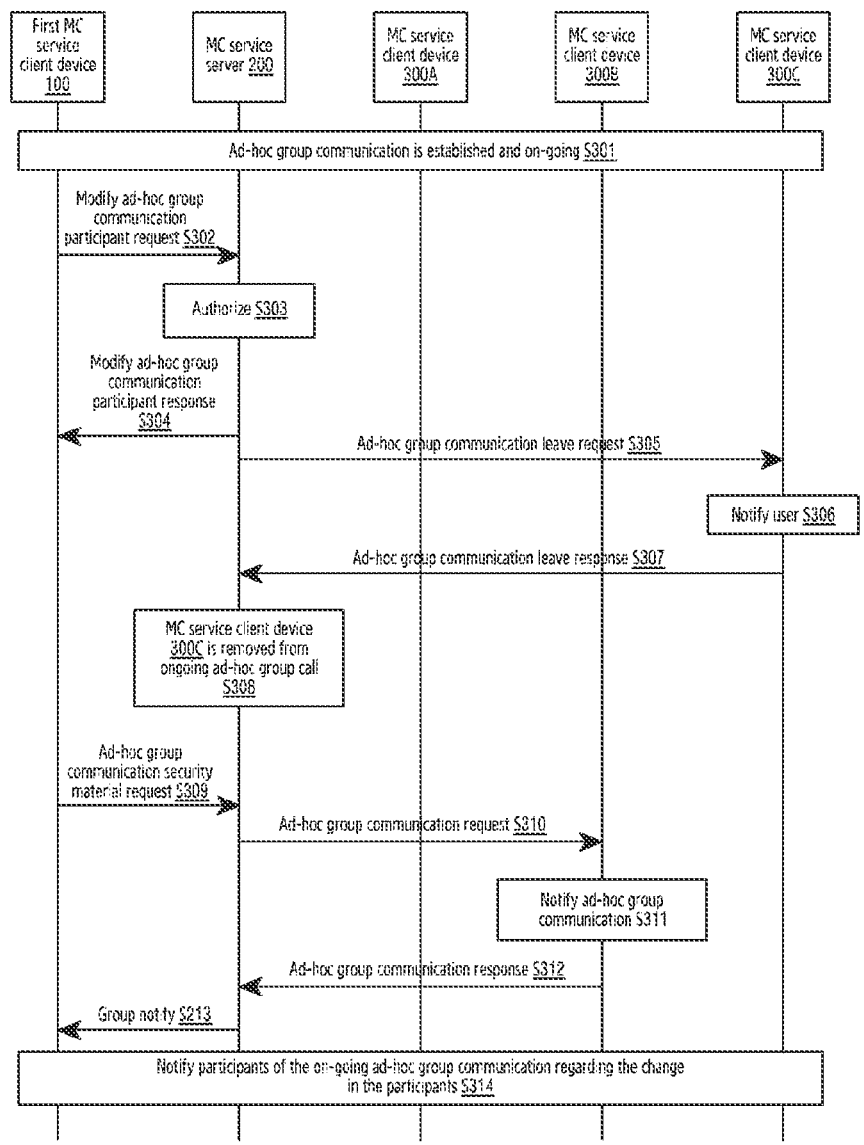
FIG. 3 illustrates a sequence diagram for removing ad-hoc group call participants from an ongoing ad-hoc group communication, according to an embodiment of disclosure.

FIG. 3 illustrates a sequence diagram for removing ad-hoc group call participants from the ongoing ad-hoc group communication, according to an embodiment of disclosure.

Pre-condition for modification of the ad-hoc group communication participants by the call initiator (i.e., first MC service client device 100):

i. The first MC service client device 100 is the call initiator of the ad-hoc group communication;

ii. The MC service users on the first MC service client device 100 and one or more second MC service client devices (e.g., 300A and 300B) are on the ongoing ad-hoc group communication; and iii. The first MC service client device 100 requests to remove the user of the second MC service client device 300C from the ad-hoc group communication and add the user of the second MC service client device 300B into the ongoing ad-hoc group communication.

At steps S301-S302, the first MC service client device 100 sends the modified ad-hoc group call participants request to the MC service server 200 to remove the second MC service client device 300C from the ongoing ad-hoc group communication and add the second MC service client device 300B into the ongoing ad-hoc group communication.

At step S303, the MC service server 200 verifies whether the first MC service client device 100 is authorized to add or remove (modify) the participants of the ongoing ad-hoc group communication. At step S304, the MC service server 200 sends the modify ad-hoc group communication participants response to the first MC service client device 100. At step S305, the MC service server 200 sends the ad-hoc group call leave request to the second MC service client device 300C to remove it from the on-going ad hoc group communication.

At step S306, the second MC service client device 300C notifies the user of the ad-hoc group call leave request. At step S307, the second MC service client device 300C sends the ad-hoc group call leave response to the MC service server 200. At step S308, the MC service server 200 removes the second MC service client device 300C from the ongoing ad-hoc group communication. At step S309, the first MC service client device 100 sends the ad-hoc group communication security material request to the second MC service client device 300B containing the security material to be shared with the second MC service client device 300B for use in the ad-hoc group communication. Steps S309 to S312 can occur at any time following step S304.

At step S310, the MC service server 200 sends the ad-hoc group communication request towards the second MC service client device 300B. At step S311, the receiving second MC service client device 300B notifies the user about the incoming ad-hoc group communication. At step S312, the second MC service client device 300B accepts the ad-hoc group communication request and sends ad-hoc group communication responses to the MC service server 200. The response may also contain a functional alias of the responding MC service user, which is verified (valid and activated for the user) by the MC service server.

At step S313, the MC service server 200 notifies about all the users who are added to the ongoing ad hoc group communication to the initiating MC service user (e.g., first MC service client device 100) of. This notification may be sent to the initiating MC service user by the MC service server 200 more than once during the call when MC service users join or leave the ad-hoc group communication. At step S314, the MC service server 200 may notify the participants about a change in the participants list of on-going ad hoc group communication.

In general, an ad-hoc group call allows the MCX user (e.g., first MC service client device 100) to select two or more MCX users and perform an MCX operation on them. This could be an MCPTT call, an MCVideo call, or an MCData operation. The proposed method uses the MCPTT service as an example and describes the system, procedures, and configuration needed to support ad-hoc group call functionality. To support the ad-hoc group call, similar procedures apply to other mission critical services such as MCData and MCVideo. The proposed method for the MCPTT client (e.g., first MC service client device 100) that can choose the method based on a configuration parameter from MCPTT user profile configuration data to support end-to-end security mechanisms for ad-hoc group call participants.

Minimum participant count for pre-configured ad-hoc group call: Configuration carries a number of minimum participant counts required for initiating the ad-hoc group call using a pre-configured group approach. With the pre-configured group approach, the MCPTT client (initiator) (e.g., first MC service client device 100) sends the list of participants (e.g., 300A, 300B, 300C) to be invited for the ad-hoc group call as part of an ad-hoc group call request (e.g., Ad-hoc group communication request) and a pre-configured group ID from which the security material is to be taken and applied for the ad-hoc group call.

If the number of participants is less than the count specified in the configuration parameter, then the MCPTT client (initiator) sends the ad-hoc group call request individually to each participant containing the security material. The security material to be used for achieving end-to-end encryption is generated dynamically by an originating MCPTT client (e.g., the first MC service client device 100) and shared with the participants in a similar mechanism adapted for a private MCPTT call as specified in 3GPP TS 33.180. This method is well suited for a less number of participants.

As an alternative, there could be a configuration parameter "Maximum participant count for non-pre-configured ad-hoc group call". The MCPTT client can choose to use the non-pre-configured approach for the ad-hoc group call if the number of participants invited for the ad-hoc group call is less than or equal to the value specified in the configuration parameter.

Overall, the proposed method that the MCPTT client can choose which method to use for placing the ad-hoc group call based on configuration parameters present in the MCPTT user profile configuration data or any other configuration data, as illustrated in Table 1 and Table 2.

TABLE 1

| Reference | Parameter description | MCPTT UE | MCPTT server | Configuration management server |
|---|---|---|---|---|
| XXX | Minimum participant count for pre-configured ad-hoc group call | Y | Y | Y |

TABLE 2

| Reference | Parameter description | MCPTT UE | MCPTT Server | Configuration management server |
|---|---|---|---|---|
| XXX | Maximum participant count for the non-pre-configured ad-hoc group call | Y | Y | Y |

Information flows for supporting the ad-hoc group call: Table-3 describes the information flow of the ad-hoc group call request from the MCPTT client (e.g., 100, 300A, 300, 300C)) to the MCPTT server (e.g., MC service server 200) for the non-pre-configured approach, as illustrated in Table 3 and Table 4.

TABLE 3

| Information element | Status | Description |
|---|---|---|
| MCPTT ID | M | The MCPTT ID of the calling party |
| Functional alias | O | The functional alias of the calling party |
| MCPTT ID | M | The MCPTT ID of the target participant of the ad-hoc group call (called party) |
| MCPTT ad hoc group ID | O | The MCPTT group ID which is generated by the MCPTT user to be associated with the ad-hoc group call |
| SDP offer | M | Media parameters of MCPTT clients |
| Implicit floor request (NOTE 3) | O | When originating client requests the floor, this element may be included |
| Broadcast indicator (NOTE 3) | O | Indicates that the ad-hoc group call request is for a broadcast ad-hoc group call |
| Imminent peril indicator (NOTE 1) (NOTE 3) | O | Indicates that the ad-hoc group call request is an MCPTT imminent peril call |
| Emergency Indicator (NOTE 1) (NOTE 3) | O | Indicates that the ad-hoc group call request is an MCPTT emergency call |
| Alert indicator (see NOTE 2) (NOTE 3) | O | Indicates whether an emergency alert is to be sent |

TABLE 3-continued

| Information element | Status | Description |
|---|---|---|
| Location information (NOTE 3) | O | Location of the calling party. |
| Requested priority (NOTE 3) | O | Application priority level requested for this call |
| Block sharing participants list indicator (NOTE 3) | O | Indicates that the participants may be able to determine a list of other participants or not |
| MCPTT ID list (NOTE 3) | O | List of participants required to acknowledge the ad-hoc group call before start of the audio transmission |
| Create group indication (NOTE 3) | O | Indicates whether the MCPTT user wants to create a permanent group with the invited participants of the ad-hoc group call |

NOTE 1:
If used, only one of these information elements may be present
NOTE 2:
This information element may be present only when the emergency indicator is present.
NOTE 3:
These information elements can be present in all of the ad-hoc group call request targeted towards each participant or they can be present only in the initial request. The initial request can be determined by adding a unique identifier or an extra information element to convey to the MCPTT server that this request is an initial request. In case these parameters are present only in the initial request, the MCPTT server may make sure to add the required parameters into the subsequent ad-hoc group call request before sending it to the target recipient.

TABLE 4

| Information element | Status | Description |
|---|---|---|
| MCPTT ID | M | The MCPTT ID of the calling party |
| Functional alias | O | The functional alias of the calling party |
| MCPTT ad-hoc group ID | O | The MCPTT group ID which is generated by the MCPTT user to be associated with the ad-hoc group call |
| SDP offer | M | Media parameters of MCPTT clients |
| Implicit floor request | O | When originating client requests the floor, this element may be included |
| Broadcast indicator | O | Indicates that the ad-hoc group call request is for a broadcast group call |
| Imminent peril indicator (NOTE 3) | O | Indicates that the ad-hoc group call request is an MCPTT imminent peril call |
| Emergency Indicator (NOTE 3) | O | Indicates that the ad-hoc group call request is an MCPTT emergency call |
| Alert indicator (see NOTE 4) | O | Indicates whether an emergency alert is to be sent |
| Functional alias list (NOTE 2) | O | List of one or more functional alias to which ad-hoc group call is placed |
| Location information | O | Location of the calling party. |
| Requested priority | O | Application priority level requested for this call |
| Block sharing participants list indicator | O | Indicates that the participants may be able to determine the list of other participants or not |
| MCPTT ID list | O | List of participants required to acknowledge the ad-hoc group call before start of the audio transmission |
| Create group indication | O | Indicates whether the MCPTT user wants to create a permanent group with the invited participants of the ad-hoc group call |

NOTE 2:
Either one of these parameters may be present or both of these parameters may be present as a target for the ad-hoc group call
NOTE 3:
If used, only one of these elements may be present;
NOTE 4:
This information element may be present only when an emergency indicator is present.

Table-5 describes the information flow of the ad-hoc group call request from the MCPTT server (e.g., MC service server 200) to the MCPTT client (e.g., 300A, 300B, 300C).

TABLE 5

| Information element | Status | Description |
|---|---|---|
| MCPTT ID | M | The MCPTT ID of the calling party |
| Functional alias | O | The functional alias of the calling party |
| MCPTT group ID | M | The MCPTT group ID of the group on which the ad-hoc group call is initiated |
| SDP offer | M | Media parameters of MCPTT server |
| Broadcast indicator | O | Indicates that the group call request is for a broadcast group call |
| Imminent peril indicator (NOTE 1) | O | Indicates that the ad-hoc group call request is an MCPTT imminent peril call |
| Emergency Indicator (NOTE 1) | O | Indicates that the ad-hoc group call request is an MCPTT emergency call |
| Alert indicator (see NOTE 2) | O | Indicates whether an emergency alert is to be sent |

NOTE 1:
If used, only one of these elements may be present
NOTE 2:
This information element may be present only when the emergency indicator is present.

Table-6 describes the information flow of an ad-hoc group call response (e.g., Ad-hoc group communication response) from the MCPTT client (e.g., 300A, 300B, 300C) to the MCPTT server (e.g., MC service server 200).

TABLE 6

| Information element | Status | Description |
|---|---|---|
| MCPTT ID | M | The MCPTT ID of the target MCPTT group member |
| Functional alias | O | The functional alias of the target MCPTT group member |
| MCPTT ad hoc group ID | M | The MCPTT group ID used for the ad-hoc group call |
| SDP answer | M | Media parameters selected |
| Result | M | Result of the group call request (success or failure) |

Table 7 describes the information flow of the ad-hoc group call response from the MCPTT server (e.g., MC service server 200) to the MCPTT client (e.g., first MC service client device 100).

TABLE 7

| Information element | Status | Description |
|---|---|---|
| MCPTT ID | M | The MCPTT ID of the calling party |
| Functional alias | O | The functional alias of the calling party |
| MCPTT ID | M | The MCPTT ID of the called party |
| Functional alias | O | The functional alias of the called party |
| MCPTT group ID | M | The MCPTT group ID used for the ad-hoc group call |
| SDP answer | M | Media parameters selected |
| Result | M | Result of the group call request (success or failure) |

In the case of the non-preconfigured approach, if the originator or any other authorized user (e.g., first MC service client device 100) of the ad-hoc group call wants to add a new participant (e.g., 300B), the MCPTT client sends the ad-hoc group call request towards the new participant. The MCPTT client has to make sure to specify the same MCPTT ad-hoc group ID in these new requests and the security material. In case the authorized user wants to remove some of the participants from the ongoing ad-hoc group call, the MCPTT client sends Modify Ad-hoc group call participants request (e.g., Modify ad-hoc group communication participant request) as specified in the Patent Application 202141042797 containing the list of participants MCPTT IDs to be removed to the MCPTT server (e.g., MC service server 200). Procedures illustrated here in the proposed method can be applied for on-demand ad-hoc group communication or the ad-hoc group call using a pre-established session. The ad-hoc group call request may carry the below information based on the request received from the MCPTT user originating the ad-hoc group call:

i. The Emergency indicator: Indicates that the ad-hoc group call request is the MCPTT emergency call;
  ii. The Alert indicator: Indicates whether an emergency alert is to be sent; and
  iii. The imminent peril indicator: Indicates that the ad-hoc group call request is the MCPTT imminent peril call.

Key management for the ad-hoc group communications using the non-pre-configured approach (AGCK): The purpose of this procedure is to allow multiple MCPX UEs (e.g., 100, 300A, 300B, 300C) to create an end-to-end security context to protect an MCX ad-hoc group communication using the non-pre-configured approach. To create the security context, an initiating MCX UE (e.g., first MC service client device 100) generates the Ad-hoc group Communication Key (AGCK) and securely transfers this key, along with a key identifier (AGCK-ID) (same as PCK is generated for private calls as specified in 3GPP TS 33.108), to all terminating MCX UEs (e.g., 300A, 300B, 300C). Prior to key distribution, all MCX UE may be provisioned by a Key Management Server (KMS) with time-limited key material associated with the MCX user as described in clause 5.3 of 3GPP TS 33.180. Prior to the initiation of the MCX ad-hoc group communication, the initiating MCX UE may generate the AGCK and the AGCK-ID. To each of the participants, the initiating MCX client may issue the ad-hoc group communication request. Within this message includes an SDP offer that contains a MIKEY-SAKKE I_MESSAGEs as defined in IETF RFC 6509 [11]. The I_MESSAGE encapsulates the AGCK for the terminating MC user, encrypting the key to the UID of the terminating user (derived from the user's URI). The I_MESSAGE also contains an identifier for the AGCK (AGCK-ID). The I_MESSAGE is signed using (the key associated with) the initiating user's UID.

Procedure for the ad-hoc group communication using the pre-configured approach when some of the participants are not members of the pre-configured group. In some cases, when using the pre-configured group approach for the ad-hoc group call, the participants invited for the ad-hoc group call may not be the group members of the pre-configured group. In this case, the end-to-end security cannot be established since the non-members of the pre-configured group do not have access to the security material that is being used for the ad-hoc group call. To handle this case, proposed method provides a hybrid approach. The MCPTT server (e.g., MC service server 200) on receiving the ad-hoc group call request using the pre-configured approach checks whether all the invited users for the ad-hoc group call are all members of the pre-configured group. If some users are not members of the pre-configured group, the MCPTT server (e.g., MC service server 200) returns those list of users to the originating MCPTT client (e.g., the first MC service client device 100). On receiving this list from the MCPTT server (e.g., MC service server 200), the originating MCPTT client (e.g., the first MC service client device 100) makes individual ad-hoc request sharing the required security material. Alternatively, if the originating MCPTT client (e.g., the first MC service client device 100) has access to the list of members of the pre-configured group, it can itself make an ad-hoc group call using the pre-configured approach to the users who are members of the pre-configured group and send ad-hoc group call requests individually to each of the participants who are not members of the pre-configured group. The MCPTT client (e.g., the first MC service client device 100 makes sure to use the same ad hoc group ID in all the requests which instructs the MCPTT server (e.g., MC service server 200) that all these requests are for the same ad-hoc group communication. This approach may be particularly useful when the ad-hoc group call is involving users from different MCPTT domains and when they are not part of the pre-configured group. Usually, the authorized users want to initiate an ad-hoc group call to the participants near to them and in some cases, these users may be from different MCPTT domains. This approach helps in handling this case without having to go through the hassle of creating/updating a pre-configured group to add the participants who are not already members of the pre-configured group.

Security procedure for ad hoc group communication using the pre-configured approach when some of the participants are not members of the pre-configured group. When using the pre-configured approach for the ad-hoc group call, a Group Master Key (GMK) and a Group Master Key Identifier (GMK-ID) of the pre-configured Group is used for establishing the security context for the ad hoc group communication. The ad-hoc group call participants who are members of the pre-configured group specified in the ad-hoc group call request may have received the GMK and GMK-ID associated with the pre-configured group from the GMS.

In some cases, when using the pre-configured approach, some of the invited participants may not be the group member of the pre-configured group and may not possess the GMK and GMK-ID of the pre-configured group. To handle this case, the proposed method distributes the GMK and GMK-ID to the non-members of the pre-configured group by the MCPT client originating the ad-hoc group call. On receiving the list of participants from the MCPTT server, who are not members of the pre-configured group, the originating MCX client sends the ad hoc group request individually targeting these participants. To each of the participants, the initiating MCX client may issue the ad hoc group communication request. Within this message includes an SDP offer that contains a MIKEY-SAKKE I_MESSAGEs as defined in IETF RFC 6509 [11]. The I_MESSAGE encapsulates the GMK of the pre-configured group, encrypting the key to the UID of the terminating user (derived from the user's URI). The I_MESSAGE also contains GMK-ID. The I_MESSAGE is signed using (the key associated with) the initiating user's UID.

Since the GMK and GMK-ID are shared with the non-members of the pre-configured group this disclosure proposes that once the ad hoc group communication is terminated, GMK and GMK-ID may be regenerated new. To achieve regeneration of new GMK and GMK-ID for the pre-configured group, the proposed method allows the MCPTT server or the MCPTT client (e.g., first MC service client device 100 requests the group management server to regenerate a new set of keys when the ad-hoc group call is terminated. This request carries the group Id of the pre-configured group.

In another alternative, for this solution to work, the MCPTT server may generate temporary or short-term identifiers say, for example, RANDsessX, using a Random Number Generator. Random Number Generator generates a random number that coordinates with the range of identifiers. This RANDsessX is provided to each ad-hoc group call participant who is a member of the pre-configured group specified in the ad-hoc group call request and possesses the GMK and GMK-ID associated with the pre-configured group from the GMS. In case when non-members of the pre-configured group the MCPTT client or the MCPTT server may generate and include the RANDsessX in the ad-hoc group call request along with the GMK and GMK-ID. This RANDsessX is a short-lived session-specific identifier and expires as soon as the session for the particular ad-hoc call is over.

In another alternative, if a member leaves or joins the ad-hoc call in the same group, the MCPTT client (e.g., first MC service client device 100) or the MCPTT server (e.g., MC service server 200) may provide a new RANDsessX to all the members of the group call to generate a fresh key for the ad-hoc call.

In another alternative, a Counterad-hoc value is associated with each session. This counter value increments for each new ad-hoc group call session, when a member joins or leaves the ad-hoc group a fresh key may be generated by each member of the call using the counter value as additional input to ensure that the member leaving the group may not be able to decode the future communication.

In another alternative, when a user is removed from the group, the group management server may choose to update the GMK associated with the group ID (depending on the security profile of the group) same as defined in clause 5.7 in 3GPP TS 33.108.

When an ad-hoc group call is started using the non-preconfigured approach, and if any new members are invited to the ongoing session, the MCPTT client (Initiator) sends the ad-hoc group call requests targeting the new participants sharing the same group ID, session ID, and security materials (AGCK, AGCK-ID) of the on-going session. Similarly when the ad-hoc group call is started using the pre-configured approach and if any new users (e.g., 300B) are invited to the ongoing session and if they are not a member of the pre-configured group, the MCPTT client (initiator) (e.g., first MC service client device 100) may share the GMK and GMK-ID of the pre-configured group to the new members (e.g., 300B) as part of the ad-hoc group call request targeted to each of the new participants (e.g., 300B).

Figure 4:
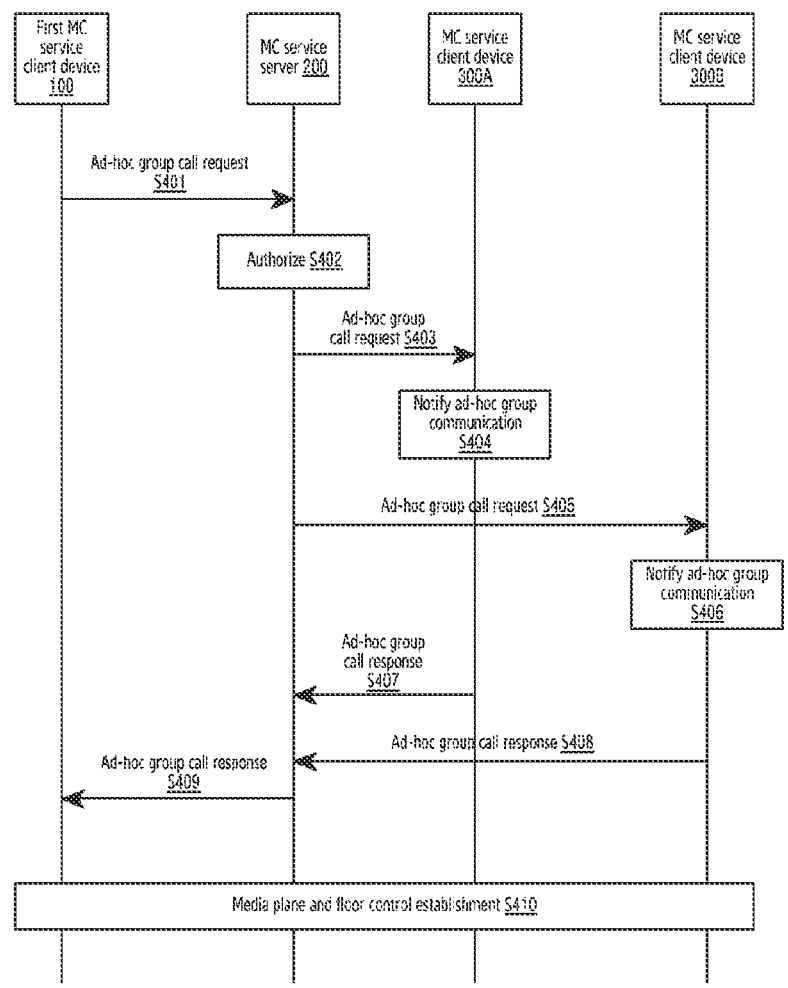
FIG. 4 illustrates a sequence diagram for initiating the ad-hoc group call setup by an authorized user, according to an embodiment of disclosure.

FIG. 4 illustrates a sequence diagram for initiating the ad-hoc group call setup by the authorized user, according to an embodiment of disclosure.

The following are the preconditions for initiating the ad-hoc group call setup:
  i. The authorized user is aware of the MCPTT users (e.g., MC service client device 300A, MC service client device 300B) who may be invited to the ad-hoc group call; and
  ii. A group ID to be used for the ad-hoc group call is generated by the originating MCPTT client (e.g., the first MC service client device 100).

The ad-hoc group call setup procedure initiated by the authorized user (e.g., the first MC service client device 100) comprises the following steps S401 to S410.

At step S401, the first MC service client device 100 initiates the ad-hoc group call by sending the ad-hoc group call request to the MC service server 200. This ad-hoc group call request contains the list of MCPTT IDs of the users (e.g., MC service client device 300A, MC service client device 300B) invited to the call. The ad-hoc group call request may also contain the block sharing participants list indicator information element set to true if the originating user (e.g., the first MC service client device 100) wants to suppress sharing of the participants list to other users. If the user at the first MC service client device 100 wants to create a permanent MCPTT group from the participants of ad-hoc group communication, create group indication information element may be set to true.

At step S402, the MC service server 200 checks whether the first MC service client device 100 is authorized to initiate the ad-hoc group call. At steps S403 and S405, the MC service server 200 send the ad-hoc group call requests towards the MCPTT clients (e.g., MC service client device 300A, MC service client device 300B) which are included in the ad-hoc group call request in step S401.

At steps S404 and S406, the receiving MCPTT clients (e.g., MC service client device 300A, MC service client device 300B) are notified about the incoming ad-hoc group call. At steps S407 and S408, the receiving MCPTT clients (e.g., MC service client device 300A, MC service client device 300B) accept the ad-hoc group call requests and send ad-hoc group call responses to the MC service server 200. At step S409, the MC service server 200 sends the ad-hoc group call response to the first MC service client device 100 through the signalling path to inform about successful call establishment. At step S410, the first MC service client device 100, the MC service client device 300A, and the MC service client device 300B establish media plane and floor control resources.

The ad-hoc group call request contains the information element block sharing participants list indicator set to true, the MC service server 200 may not allow participants other than the originating user (e.g., the first MC service client device 100) or authorized user to determine the list of users joined the ad-hoc group call. If the ad-hoc group call request contains the information element create group indication set to true and if the user is authorized to create an MCPTT group, the MC service server 200 may follow the procedure in sub-clause 10.2.3 "Group Creation" on behalf of the MCPTT Client. The ad-hoc group call response can be given to the initiator (e.g., the first MC service client device 100) if the conditions if specified in the ad-hoc group call request are met and audio transmission can start. For example, if all the mandatory participants specified in the ad-hoc group call request joined the call, the ad-hoc group call response can be sent to the initiator (e.g., the first MC service client device 100) so that audio transmission can begin.

Figure 5:
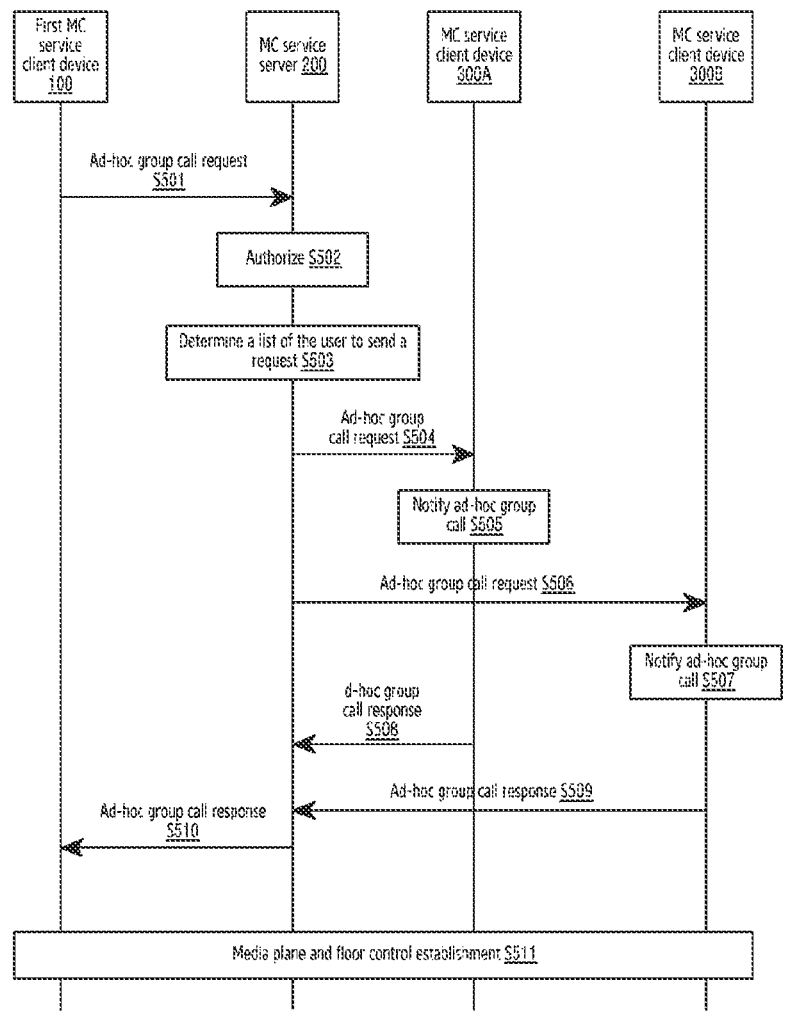
FIG. 5 illustrates a sequence diagram for initiating the ad-hoc group call setup by the authorized user, according to another embodiment of disclosure.

FIG. 5 illustrates a sequence diagram for initiating the ad-hoc group call setup by the authorized user, according to another embodiment of disclosure.

The following are the preconditions for initiating the ad-hoc group call setup:
  i. The authorized user (e.g., the first MC service client device 100) is aware of the MCPTT users (e.g., MC service client device 300A, MC service client device 300B) who may be invited to the ad-hoc group call;
  ii. A group ID to be used for the ad-hoc group call is generated by the originating MCPTT client (e.g., the first MC service client device 100);
  iii. MCPTT clients 1 (e.g., the first MC service client device 100) to n are registered and their respective users, MCPTT user 1 to MCPTT user n (e.g., MC service client device (300N) (not shown in FIG. 5)), are authenticated and authorized to use the MCPTT service, as per procedure in sub-clause 10.2 of 3GPP TS 23.379;

iv. The MC service client device 300A to n (e.g., MC service client device (300N) (not shown in FIG. 5)) have activated the same functional alias; and v. The MC service server 200 has subscribed to an MCPTT functional alias controlling server within the MC system for functional alias activation/de-activation updates.

The steps of the ad-hoc group call setup procedure initiated by the authorized user are as follows in steps S501 to S511.

At step S501, the first MC service client device 100 initiates the ad-hoc group call by sending the ad-hoc group call request to the MC service server 200. The ad-hoc group call request contains the list of MCPTT IDs of the users or functional alias or both MCPTT IDs and functional alias as potential targets of the ad-hoc group call. The ad-hoc group call request may also contain the block sharing participants list indicator information element set to true if the originating user (e.g., the first MC service client device 100) wants to suppress sharing of the participants list to other users. If the user at the first MC service client device 100 wants to create a permanent MCPTT group from the participants of ad-hoc group communication, the create group indication information element may be set to true.

At step S502, the MC service server 200 checks whether the first MC service client device 100 is authorized to initiate the ad-hoc group call. At step S503, the MC service server 200 determines the list of MCPTT users to send MCPTT ad-hoc group call request, based on a set of potential target recipients (e.g., MC service client device 300A, MC service client device 300B) obtained from the ad-hoc group call request from the first MC service client device 100. When the functional alias is used as target address, the MC service server 200 resolves the functional alias to a corresponding list of related MCPTT IDs of the MC service client device 300A to the MC service client device 300B who have activated the functional alias. The functional alias may have been activated to identify the MCPTT IDs of the called users.

At steps S504 and S506, the MC service server 200 send the ad-hoc group call requests towards the MCPTT clients which are determined in step S503. At steps S505 and S507, the receiving MCPTT clients (e.g., MC service client device 300A and MC service client device 300B) are notified about the incoming ad-hoc group call. At steps S508 and S509, the receiving MCPTT clients accept the ad-hoc group call requests and send the ad-hoc group call responses to the MC service server 200.

At step S510, the MC service server 200 sends the ad-hoc group call response to the first MC service client device 100 through the signalling path to inform about successful call establishment. At step S511, the first MC service client device 100, the MC service client device 300A, and the MC service client device 300A establish the media plane and the floor control resources.

If the ad-hoc group call request contains the information element block sharing participants list indicator set to true, the MC service server 200 may not allow participants other than the originating user (e.g., the first MC service client device 100) or authorized user to determine the list of user joined the ad-hoc group call. If the ad-hoc group call request contains the information element create group indication set to true and if the user is authorized to create MCPTT group, the MC service server 200 may follow the procedure in sub-clause 10.2.3 "Group Creation" on behalf of the first MC service client device 100. The ad-hoc group call response can be given to the initiator (e.g., the first MC service client device 100) if the conditions if specified in the ad-hoc group call request are met and audio transmission can start. For example, if all the mandatory participants specified in the ad-hoc group call request joined the call, the ad-hoc group call response can be sent to the initiator (e.g., the first MC service client device 100) so that audio transmission can begin.

Figure 6:
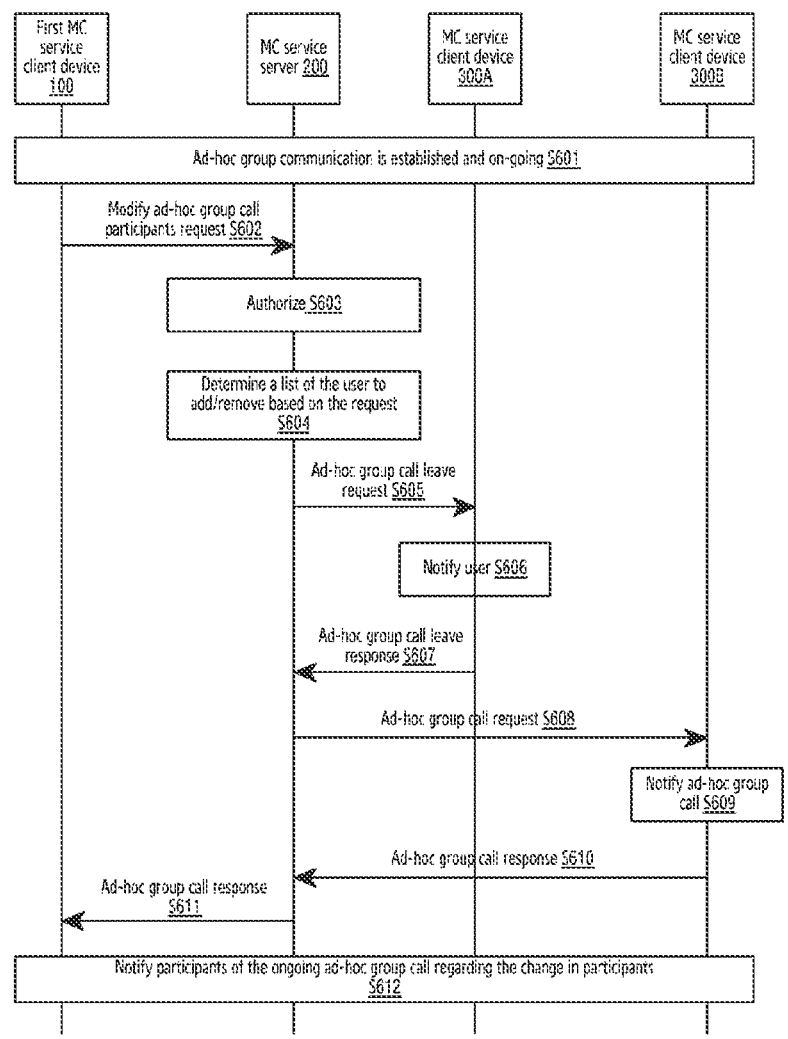
FIG. 6 illustrates a sequence diagram for modifying the ad-hoc group call participants from the ongoing ad-hoc group communication, according to an embodiment of disclosure.

FIG. 6 illustrates a sequence diagram for modifying the ad-hoc group call participants from the ongoing ad-hoc group communication, according to an embodiment of disclosure.

The following are the preconditions for modifying the ad-hoc group call setup.

i. The MCPTT users on the first MC service client device 100 and the MC service client device 300A are on the ongoing ad-hoc group call, as illustrated in step S601;

ii. The first MC service client device 100 is the initiator of the ad-hoc group call; and iii. The first MC service client device 100 indicates to remove the user of the MC service client device 300A and add the MCPTT user of the MC service client device 300B to the ongoing ad-hoc group call.

The signalling control plane procedures for the initiator of the MCPTT ad-hoc group call to modify the participants of the ongoing ad-hoc group call are as follows in steps S602 to S612.

At step S602, the first MC service client device 100 sends the modify ad-hoc group call participants request to the MC service server 200. At step S603, the MC service server 200 verifies whether the first MC service client device 100 is authorized to add or remove (modify) the participants of the ongoing ad-hoc group call. At step S604, the MC service server 200 determines the list of participants who needs to be added and/or removed from the ongoing ad-hoc group call based on the request received in step S601.

At step S605, the MC service server 200 sends the ad-hoc group call leave request to the MC service client device 300A to remove it from the on-going ad-hoc group call. At step S606, the MC service client device 300A notifies the user of the ad-hoc group call leave request. At step S607, the MC service client device 300A sends the ad-hoc group call leave response to the MC service server 200.

At step S608, the MC service server 200 sends the ad-hoc group call request to the MC service client device 300B to add it to the on-going ad-hoc group call. At step S609, the MC service client device 300B notifies the user of the incoming ad-hoc group call request. At step S610, the MC service client device 300B sends the ad-hoc group call response to the MC service server 200. At step S611, the MC service server 200 sends the modify ad-hoc group call participants response to the first MC service client device 100. At step S612, the MC service server 200 may notify the participants of the ad-hoc group call regarding the change in the participants list.

Modify ad-hoc group call participants request may carry the list of participants to be added and removed in the same request or it can be carried in different request. Steps S405 and S408 may happen in parallel. In some cases, the MC service server 200 itself can remove the participants from the ongoing ad-hoc group call without the request from the initiator of the ad-hoc group call (e.g., the first MC service client device 100) or from the authorized user. MC service server 200 may remove the low-priority users from the ongoing ad-hoc group call in case of congestion. Also, the initiator can add the removed users later point in time. Apart from the initiator of the ad-hoc group call, the authorized user may also add or remove participants from the ongoing ad-hoc group call.

Figure 7:
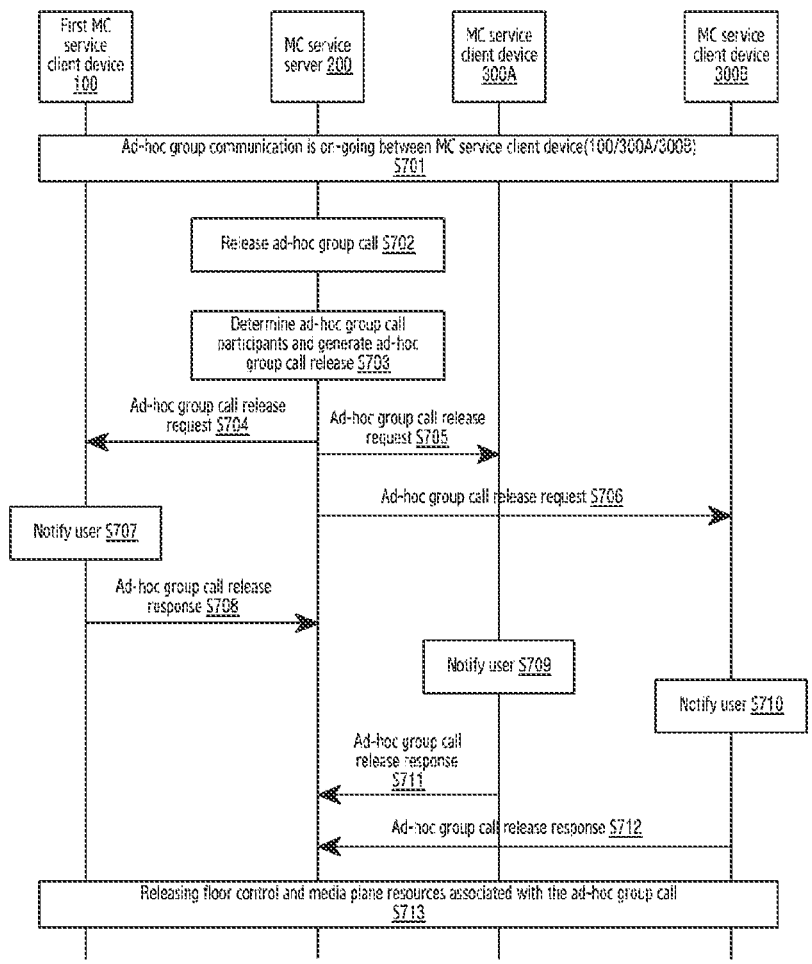
FIG. 7 illustrates a sequence diagram for initiating termination of the ongoing ad-hoc group communication by the first MC service client device, according to an embodiment of disclosure.

FIG. 7 illustrates a sequence diagram for initiating termination of the ongoing ad-hoc group communication by the first MC service client device 100, according to an embodiment of disclosure.

Procedure for the MC service server 200 releasing the ad-hoc group call. The procedure focuses on the case where the MC service server 200 initiates the termination of the ongoing ad-hoc group call for all the participants of that ad-hoc group call since one or more termination conditions are met e.g., due to hang time expiry, last participant leaving, second last participant leaving, initiator leaving.

At step S701, it is assumed that MCPTT users on the first MC service client device 100, the MC service client device 300A, and the MC service client device 300B are already part of the ongoing ad-hoc group call. At step S702, the MC service server 200 may like to release the MCPTT ad-hoc group call which is ongoing e.g., due to hang time expiry, last participant leaving, second last participant leaving, initiator leaving. At step S703, the MC service server 200 identifies the participants of the ongoing ad-hoc group call and generates ad-hoc group call release request to release the ongoing session.

At steps S704, S705, and S706, the MC service server 200 sends the ad-hoc group call release request via SIP core towards each participant of the ongoing ad-hoc group call. At steps S707, S709, and S710, the MCPTT users are notified about the release of the ad-hoc group call. At steps S708, S711, and S712, the MCPTT client(s) receiving the ad-hoc group call release request, acknowledge towards the MC service server 200 by sending the ad-hoc group call release response. At step S713, the first MC service client device 100, the MC service client device 300A and the MC service client device 300B have successfully released the floor control and media plane resources associated with the group call that is terminated.

Figure 8:
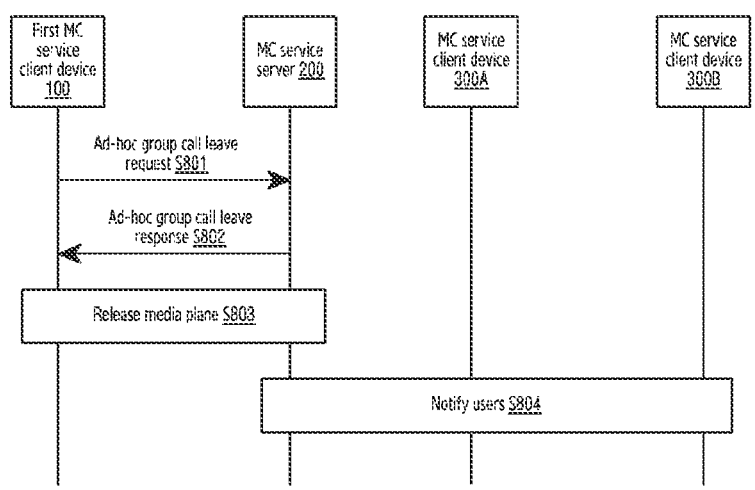
FIG. 8 illustrates a sequence diagram in which the first MC service client device leaves the ongoing ad-hoc group communication, according to an embodiment of disclosure.

FIG. 8 illustrates a sequence diagram in which the first MC service client device 100 leaves the ongoing ad-hoc group communication, according to an embodiment of disclosure.

The pre-conditions are as follows:
i. The MCPTT users on the first MC service client device 100 to MCPTT client n (e.g., MC service client device 300A, MC service client device 300B) are on an ongoing ad-hoc group call; and
ii. The first MC service client device 100 indicates to leave the ad-hoc group call.

The signalling control plane procedures for the MCPTT user leaving an ongoing MCPTT ad-hoc group call are as follows in steps S801 to S804.

At step S801, the first MC service client device 100 sends the ad-hoc group call leave request to the MC service server 200. At step S802, the MC service server 200 sends the ad-hoc group call leave response to the first MC service client device 100. At step S803, the release of the floor control and the media plane resources associated with the ad-hoc group call for the first MC service client device 100. The MC service server 200 checks if group call termination conditions are met, e.g., hang time expiry, last participant leaving, second last participant leaving, initiator leaving, and minimum number of affiliated MCPTT group members are not present. If one or more group call termination conditions are met, the MC service server 200 releases the ad-hoc group call for all participants as described in the procedure "MC service server 200 releasing the ad-hoc group call" of the proposed method. At step S804, the MCPTT users at the MC service client device 300A to the MC service client device 300B may be notified that the first MC service client device 100 has left the ad-hoc group call. The functional alias of the first MC service client device 100 is displayed, if present. The MC service server 200 does not perform late entry for MCPTT users that have left the ad-hoc group call.

Figure 9:
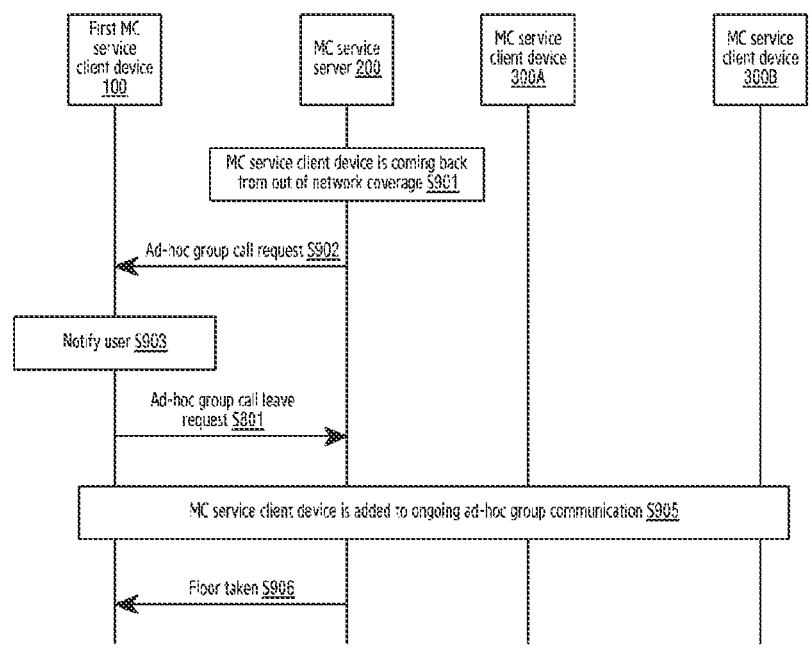
FIG. 9 illustrates a sequence diagram in which the MC service server requests the first MC service client device to re-join the ongoing ad-hoc group communication after returning from out-of-network coverage, according to an embodiment of disclosure.

FIG. 9 illustrates a sequence diagram in which the MC service server 200 requests the first MC service client device 100 to re-join the ongoing ad-hoc group communication after returning from out-of-network coverage, according to an embodiment of disclosure.

This procedure applies to all types of the ad-hoc group call, including, for example, the emergency call, the imminent peril call (an MCPTT imminent peril call), and the broadcast call.

The pre-conditions are as follows.
i. It is assumed that MCPTT users on the MC service client device 300A to the MC service client device 300B are on an ongoing ad-hoc group call. Optionally, the MCPTT users may use activated functional aliases; and
ii. The first MC service client device 100 is not available during the initiation of the MCPTT ad-hoc group call.

The signalling control plane procedures for the MC service server 200 requesting member coming back from out of coverage to join an ongoing MCPTT ad-hoc group call are as follows in steps S901 to S906.

At step S901, the MC service server 200 determines that the first MC service client device 100, which is part of the invited members, is coming back from out of coverage and has to be invited to join the ongoing ad-hoc group call (late entry). At step S902, the MC service server 200 generates ad-hoc group call request including the information such as the MCPTT service identifier (possible for the SIP core to route the request to the MC service server 200), MCPTT group ID of the ad-hoc group invited to join, offer one or more media types and sends towards the first MC service client device 100 via SIP core. At step S903, the MCPTT user at the first MC service client device 100 is notified about the incoming ad-hoc group call. At step S904, upon the MCPTT user at the first MC service client device 100 accepting the incoming group call request, the first MC service client device 100 sends the ad-hoc group call response including selected media types to the MC service server 200 through the signalling path. If the incoming ad-hoc group call request is rejected by the first MC service client device 100, the MC service server 200 may not resend the ad-hoc group call request. The ad-hoc group call response may also contain the functional alias of the first MC service client device 100.

At step S905, the first MC service client device 100 is successfully added to the ongoing ad-hoc group call and MCPTT users at the first MC service client device 100 to MCPTT client n (e.g., the MC service client device 300B) may be notified about the first MC service client device 100 joining the group call and the functional alias of the first MC service client device 100 may be displayed. At step S906, the floor taken with the information of the current talker is sent to the first MC service client device 100.

Figure 10:
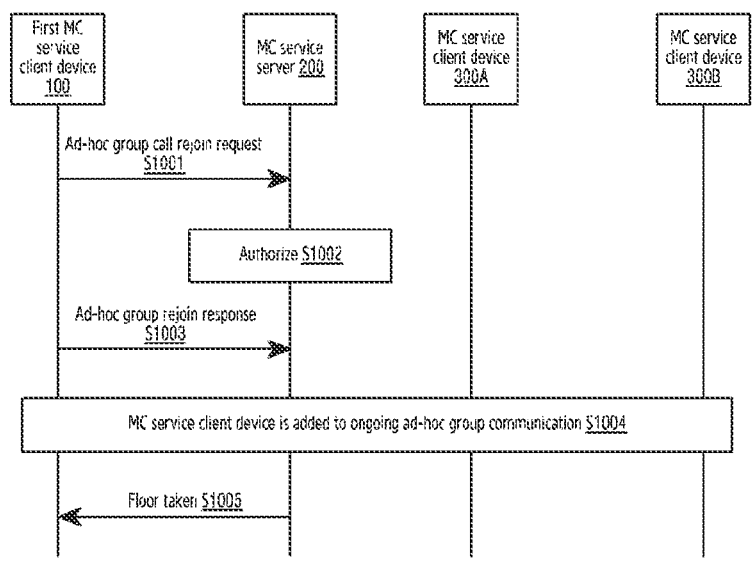
FIG. 10 illustrates a sequence diagram in which the first MC service client device requests the MC service server to re-join the ongoing ad-hoc group communication after returning from out-of-network coverage, according to an embodiment of disclosure.

FIG. 10 illustrates a sequence diagram in which the first MC service client device 100 requests the MC service server 200 to re-join the ongoing ad-hoc group communication after returning from out-of-network coverage, according to an embodiment of disclosure.

The pre-conditions are as follows:
i. It is assumed that MCPTT users on the MC service client device 300A to the MC service client device 300B are on an ongoing call. Optionally, the MCPTT users may use activated functional aliases.

The signalling control plane procedures for the MCPTT client to rejoin the ongoing MCPTT ad-hoc group call are as follows in steps S1001 to S1005.

At step S1001, the first MC service client device 100 has necessary information for rejoining an ongoing ad-hoc group call. The first MC service client device 100 initiates ad-hoc group call rejoin request including the ongoing ad-hoc group call information. The ad-hoc group call rejoin request may contain the functional alias of the first MC service client device 100 as selected by the MC service user. At step S1002, the MC service server 200 checks whether the first MC service client device 100 can rejoin the ongoing call.

At step S1003, the first MC service client device 100 is informed that the ad-hoc group call rejoin is successful by sending ad-hoc group call rejoin response. If the ongoing ad-hoc group call is an emergency or imminent peril group call, the response may contain the emergency or imminent peril indicator. At step S1004, the first MC service client device 100 is successfully added to the ongoing ad-hoc group call and MCPTT users at the first MC service client device 100 to MCPTT client n may be notified about the first MC service client device 100 joining the ad-hoc group call and the functional alias of the first MC service client device 100 may be displayed. At step S1005, the floor taken with the information of the current talker is sent to the first MC service client device 100.

Ad-hoc group call related configuration: In order to support the ad-hoc group call, there needs to be proper configurations in place. In addition to the configuration parameters specified in the Indian patent application 202141019166, embodiments herein propose the below additional parameters:

i. Ad-hoc group communication support: Some deployments may choose to not support the ad-hoc group call feature for any reason. In order to achieve this functionality, the proposed method introduces a configuration parameter in the MCX service configuration as shown in Table 8.

TABLE 8

| Reference | Parameter description | MCPTT UE | MCPTT server | Configuration management server |
|---|---|---|---|---|
| XXX | Ad hoc group communication support | Y | Y | Y |

When this configuration is set to false, then MCPTT server (e.g., MC service server 200) rejects any incoming ad-hoc group call request from the MCPTT clients (e.g., first MC service client device 100, MC service client device 300A, MC service client device 300B, etc.). the MCPTT client also may not originate ad-hoc group call request when this configuration is set to false.

ii. Hang timer for the ad-hoc group communication: This configuration, as shown in Table 9, indicates the MC service server 200 to release the ongoing ad hoc group communication after a hang timer expires. This could also be indicated by the originator (e.g., first MC service client device 100) of the MCPTT ad-hoc group call in the ad-hoc group call request or it can be configured in the MCPTT service configuration data or any other document.

TABLE 9

| Reference | Parameter description | MCPTT UE | MCPTT server | Configuration management server |
|---|---|---|---|---|
| XXX | Ad-hoc group call hang timer | N | Y | Y | iii. Maximum duration for the ad-hoc group communication: This configuration, as shown in Table 10, allows an MCX service administrator to specify a maximum allowed time duration for the MCPTT ad-hoc group communication to remain active. Alternatively, this could also be indicated by the originator e.g., the first MC service client device 100) of the MCPTT ad-hoc group call in the ad-hoc group call request. Once this maximum duration is reached, the MC service server 200 may release the ongoing ad-hoc group communication. If the ongoing ad-hoc group communication happens to be the emergency call (an MCPTT emergency call) or imminent peril call (an MCPTT imminent peril call), the MC service server 200 may not release the call.

TABLE 10

| Reference | Parameter description | MCPTT UE | MCPTT server | Configuration management server |
|---|---|---|---|---|
| XXX | Maximum duration of ad-hoc group calls | N | Y | Y |

Information flows for supporting ad-hoc group call: Table 11 describes the information flow of ad-hoc group call request from the MCPTT client (e.g., first MC service client device 100) to the MC service server 200.

TABLE 11

| Information Element | Status | Description |
|---|---|---|
| MCPTT ID | M | The MCPTT ID of the calling party |
| Functional alias | O | The functional alias of the calling party |
| MCPTT ad hoc group ID (See NOTE 2) | O | The MCPTT group ID which is generated by the MCPTT user to be associated with the ad-hoc group call |
| Pre-configured MCPTT group ID | M | MCPTT group ID of the group from which configuration is to be taken for this ad-hoc group call |
| SDP offer | M | Media parameters of MCPTT clients |
| Implicit floor request | O | When originating client requests the floor, this element may be included |
| Broadcast indicator | O | Indicates that the ad-hoc group call request is for a broadcast ad-hoc group call |
| Imminent peril indicator (NOTE 4) | O | Indicates that the ad-hoc group call request is an MCPTT imminent peril call |
| Emergency Indicator (NOTE 4) | O | Indicates that the ad-hoc group call request is an MCPTT emergency call |
| MCPTT ID list (See NOTE 3) | O | The MCPTT ID of users being invited to the ad-hoc group call |

TABLE 11-continued

| Information Element | Status | Description |
|---|---|---|
| Functional alias (NOTE 3) | O | Functional alias to which ad-hoc group call is placed |
| Location information | O | Location of the calling party. |
| Requested priority | O | Application priority level requested for this call |
| Block sharing participants list indicator | O | Indicates that the participants may be able to determine list of other participants or not |
| MCPTT ID list | O | List of participants required to acknowledge the ad-hoc group call before start of the audio transmission |
| Create group indication | O | Indicates whether the MCPTT user wants to create a permanent, group with the invited participants of the ad-hoc group call |

NOTE 1:
This parameter may be present if the group call request is for the pre-defined group
NOTE 2:
This parameter may be present if the group call request is for ad-hoc group call.
NOTE 3:
Either one of these parameters may be present as the target for the ad-hoc group call
NOTE 4:
If used, only one of these information elements may be present.

Table 12 depicts the ad-hoc group call request information elements when a combination of the functional alias and MCPTT IDS are being used as the target.

TABLE 12

| Information element | Status | Description |
|---|---|---|
| MCPTT ID | M | The MCPTT ID of the calling party |
| Functional alias | O | The functional alias of the calling party |
| MCPTT ad hoc group ID | O | The MCPTT group ID which is generated by the MCPTT user to be associated with the ad-hoc group call |
| Pre-configured MCPTT group ID | M | MCPTT group ID of the group from which configuration is to be taken for this ad-hoc group call |
| SDP offer | M | Media parameters of MCPTT clients |
| Implicit floor request | O | When originating client requests the floor, this element may be included |
| Broadcast indicator | O | Indicates that the ad-hoc group call request is for a broadcast group call |
| Imminent peril indicator (NOTE 3) | O | Indicates that the ad-hoc group call request is an MCPTT imminent peril call |
| Emergency Indicator (NOTE 3) | O | Indicates that the ad-hoc group call request is an MCPTT emergency call |
| Alert indicator (see NOTE 4) | O | Indicates whether an emergency alert, is to be sent |
| MCPTT ID list (NOTE 2) | O | The MCPTT ID of users being invited to the ad-hoc group call |
| Functional alias list (NOTE 2) | O | List of one more functional alias to which ad-hoc group call is placed |
| Location information | O | Location of the calling party. |
| Requested priority | O | Application priority level requested for this call |
| Block sharing participants list indicator | O | Indicates that the participants may be able to determine list of other participants or not |
| MCPTT ID list | O | List of participants required to acknowledge the ad-hoc group call before start of the audio transmission |
| Create group indication | O | Indicates whether the MCPTT user wants to create a permanent group with the invited participants of the ad-hoc group call |

NOTE 2:
Either one of these parameters may be present or both of these parameters may be present as target for the ad-hoc group call
NOTE 3:
If used, only one of these elements may be present
NOTE 4:
This information element may be present only when the Emergency indicator is present.

Table-13 describes the information flow of the ad-hoc group call request from the MC service server 200 to the MCPTT client (e.g., MC service client device 300A to the MC service client device 300B). Table 13 depicts the Ad-hoc group call request information elements.

TABLE 13

| Information element | Status | Description |
|---|---|---|
| MCPTT ID | M | The MCPTT ID of the calling party |
| Functional alias | O | The functional alias of the calling party |
| MCPTT group ID | M | The MCPTT group ID of the group on which the ad-hoc group call is initiated |
| SDP offer | M | Media parameters of MCPTT server |
| Broadcast indicator | O | Indicates that the group call request is for a broadcast group call |
| Imminent peril indicator (NOTE 1) | O | Indicates that the ad-hoc group call request is an MCPTT imminent peril call |
| Emergency Indicator (NOTE 1) | O | Indicates that the ad-hoc group call request is an MCPTT emergency call |
| Alert indicator (see NOTE 2) | O | Indicates whether an emergency alert is to be sent |

NOTE 1:
If used, only one of these elements may be present
NOTE 2:
This information element may be present only when the Emergency indicator is present.

Table-14 describes the information flow of the modify ad-hoc group call participants request from the MCPTT client (e.g., the first MC service client device 100) to the MCPTT server (e.g., MC service server 200) and between the MCPTT servers. Table 14 depicts the modify ad-hoc group call participants request information elements.

TABLE 14

| Information Element | Status | Description |
|---|---|---|
| MCPTT ID | M | The MCPTT ID of the calling party |
| Functional alias | O | The functional alias of the calling party |
| MCPTT ad hoc group ID | M | The MCPTT group ID of ad-hoc group call whose participants list needs to be modified |
| MCPTT ID list (NOTE 1) | O | List of additional MCPTT users to be invited for the on-going ad-hoc group call |
| MCPTT ID list (NOTE 1) | O | List of MCPTT users to be removed from the on-going ad-hoc group call |

NOTE 1:
Either one or both of these elements may be present

Table-15 describes the information flow of the modify ad-hoc group call participants response from the MCPTT client (e.g., MC service client device 300A) to the MCPTT server (e.g., MC service server 200) and between the MCPTT servers. Table 15 depicts the modify ad-hoc group call participants response information elements.

TABLE 15

| Information element | Status | Description |
| --- | --- | --- |
| MCPTT ID | M | The MCPTT ID of the calling party |
| Functional alias | O | The functional alias of the calling party |
| MCPTT ad hoc group ID | M | The MCPTT group ID of ad-hoc group call whose participants list needs to be modified |
| Result | M | Result of the modify ad-hoc group call participants request (success of failure) |

Table 16 describes the information flow of the ad-hoc group call release request from the MCPTT server (e.g., MC service server 200) to the MCPTT client (e.g., the first MC service client device 100) and from the MCPTT client (e.g., MC service client device 300A) to the MCPTT server and between the MCPTT servers. Table-16 depicts the ad-hoc group call release request information elements.

TABLE 16

| Information Element | Status | Description |
| --- | --- | --- |
| MCPTT ID | M | The MCPTT ID of the ad-hoc group call participant |
| Functional alias | O | The functional alias of the ad-hoc group call participant |
| MCPTT ad hoc group ID | M | The MCPTT group ID of ad-hoc group call on which the call is released |

Table 17 describes the information flow ad-hoc group call release response from the MCPTT server (e.g., MC service server 200) to the MCPTT client (e.g., the first MC service client device 100) and from the MCPTT client (e.g., MC service client device 300A) to the MCPTT server and between the MCPTT servers. Table 17 depicts the ad-hoc group call release response information elements.

TABLE 17

| Information element | Status | Description |
| --- | --- | --- |
| MCPTT ID | M | The MCPTT ID of the ad-hoc group call participant |
| Functional alias | O | The functional alias of the ad-hoc group call participant |
| MCPTT ad hoc group ID | M | The MCPTT group ID of ad-hoc group call on which the call is released |

Table 18 describes the information flow the ad-hoc group call leave request from the MCPTT server to the MCPTT client.

TABLE 18

| Information element | Status | Description |
| --- | --- | --- |
| MCPTT ID | M | The MCPTT ID of the ad-hoc group call participant who needs to be removed from the on-going ad-hoc group call |
| Functional alias | O | The functional alias of the ad-hoc group call participant who needs to be removed from the on-going ad-hoc group call |
| MCPTT ad hoc group ID | M | The MCPTT group ID of ad-hoc group call on which call is on-going |

Table 19 describes the information flow of the ad-hoc group call leave request from the MCPTT client to the MCPTT server.

TABLE 19

| Information element | Status | Description |
| --- | --- | --- |
| MCPTT ID | M | The MCPTT ID of the ad-hoc group call participant leaving the call |
| Functional alias | O | The functional alias of the ad-hoc group call participant leaving the ad-hoc group call |
| MCPTT ad hoc group ID | M | The MCPTT group ID of ad-hoc group call on which call is on-going |

Table 20 describes the information flow of the ad-hoc group call release response from the MCPTT client to the MCPTT server.

TABLE 20

| Information element | Status | Description |
| --- | --- | --- |
| MCPTT ID | M | The MCPTT ID of the ad-hoc group call participant who is removed from the ongoing ad-hoc group call |
| Functional alias | O | The functional alias of the ad-hoc group call participant who is removed from the ongoing ad-hoc group call |
| MCPTT ad hoc group ID | M | The MCPTT group ID of ad-hoc group call on which call is on-going |

Table 21 describes the information flow of the ad-hoc group call release response from the MCPTT server to the MCPTT client.

TABLE 21

| Information element | Status | Description |
| --- | --- | --- |
| MCPTT ID | M | The MCPTT ID of the ad-hoc group call participant leaving the ongoing ad-hoc group call |
| Functional alias | O | The functional alias of the ad-hoc group call participant leaving the ongoing ad-hoc group call |
| MCPTT ad hoc group ID | M | The MCPTT group ID of ad-hoc group call on which call is on-going |

Table 22 describes the information flow of the ad-hoc group call rejoin request from the MCPTT client to the MCPTT server.

TABLE 22

| Information element | Status | Description |
| --- | --- | --- |
| MCPTT ID | M | The MCPTT ID of the re-joining MCPTT user |
| Functional alias | O | The functional alias of the re-joining MCPTT user |
| MCPTT ad hoc group ID | M | The MCPTT group ID of the ad-hoc group call |
| SDP offer | M | Media parameters of MCPTT client |

Table 23 describes the information flow of the ad-hoc group call rejoin response from the MCPTT server to the MCPTT client.

TABLE 23

| Information element | Status | Description |
| --- | --- | --- |
| MCPTT ID | M | The MCPTT ID of the MCPTT user re-joining the ad-hoc group call |
| Functional alias | O | The functional alias of the MCPTT user re-joining the ad-hoc group call |
| MCPTT ad hoc group ID | M | The MCPTT group ID of the ad-hoc group call |
| SDP answer | M | Media parameters selected |
| Emergency indicator | O | Indicates that the ongoing ad-hoc group call is an MCPTT emergency ad-hoc group call |
| Imminent peril indicator | O | Indicates that the ongoing ad-hoc group call is an MCPTT imminent peril ad-hoc group call |

Figure 11:
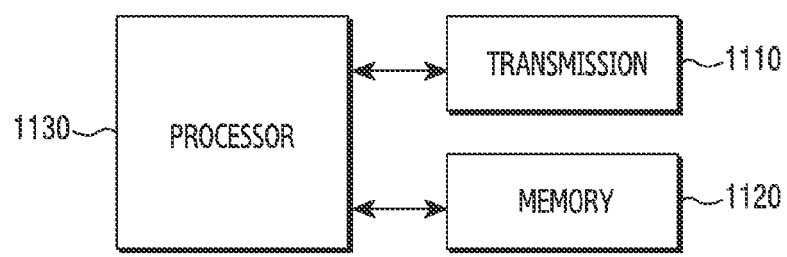
FIG. 11 illustrates a structure of a UE according to an embodiment of the disclosure.

FIG. 11 illustrates a structure of a UE according to an embodiment of the disclosure.

As shown in FIG. 11, the UE according to an embodiment may include a transceiver 1110, a memory 1120, and a processor 1130. The transceiver 1110, the memory 1120, and the processor 1130 of the UE may operate according to a communication method of the UE described above. However, the components of the UE are not limited thereto. For example, the UE may include more or fewer components than those described above. In addition, the processor 1130, the transceiver 1110, and the memory 1120 may be implemented as a single chip. Also, the processor 1130 may include at least one processor. Furthermore, the UE of FIG. 11 corresponds to the first MC service client device of the FIG. 1A.

The transceiver 1110 collectively refers to a UE receiver and a UE transmitter, and may transmit/receive a signal to/from a base station or a network entity. The signal transmitted or received to or from the base station or a network entity may include control information and data. The transceiver 1110 may include a RF transmitter for up-converting and amplifying a frequency of a transmitted signal, and a RF receiver for amplifying low-noise and down-converting a frequency of a received signal. However, this is only an example of the transceiver 1110 and components of the transceiver 1110 are not limited to the RF transmitter and the RF receiver.

Also, the transceiver 1110 may receive and output, to the processor 1130, a signal through a wireless channel, and transmit a signal output from the processor 1130 through the wireless channel.

The memory 1120 may store a program and data required for operations of the UE. Also, the memory 1120 may store control information or data included in a signal obtained by the UE. The memory 1120 may be a storage medium, such as read-only memory (ROM), random access memory (RAM), a hard disk, a CD-ROM, and a DVD, or a combination of storage media.

The processor 1130 may control a series of processes such that the UE operates as described above. For example, the transceiver 1110 may receive a data signal including a control signal transmitted by the base station or the network entity, and the processor 1130 may determine a result of receiving the control signal and the data signal transmitted by the base station or the network entity.

Figure 12:
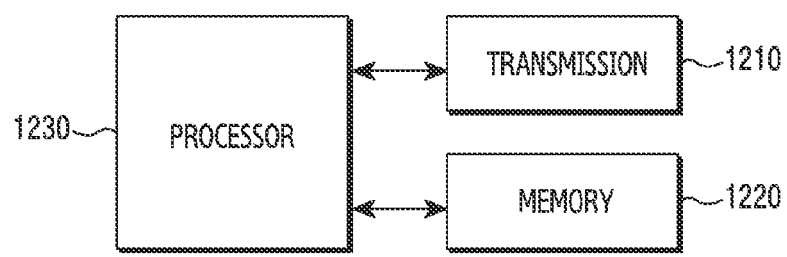
FIG. 12 is a block diagram showing an internal structure of a network entity, according to an embodiment of the present disclosure.

FIG. 12 is a block diagram showing an internal structure of a network entity, according to an embodiment of the present disclosure. As shown in FIG. 12, the network entity of the present disclosure may include a transceiver 1210, a memory 1220, and a processor 1230. The transceiver 1210, the memory 1220, and the processor 1230 of the network entity may operate according to a communication method of the network entity described above. However, the components of the terminal are not limited thereto. For example, the network entity may include more or fewer components than those described above. In addition, the processor 1230, the transceiver 1210, and the memory 1220 may be implemented as a single chip. Also, the processor 1230 may include at least one processor. Furthermore, the network entity of FIG. 12 corresponds to the MC service server 200 of the FIG. 1B.

According to the present disclosure, the network entity includes at least one entity of a core network. For example, the network entity includes AMF (access and mobility management function), SMF (session management function), PCF (policy control function), NRF (network repository function), UPF (user plane function), NSSF (network slicing selection function), AUSF (authentication server function), UDM (unified data management) and NEF (network exposure function). However, the network entity is not limited thereto.

The transceiver 1210 collectively refers to a network entity receiver and a network entity transmitter, and may transmit/receive a signal to/from a base station or a UE. The signal transmitted or received to or from the base station or the UE may include control information and data. In this regard, the transceiver 1210 may include a RF transmitter for up-converting and amplifying a frequency of a transmitted signal, and a RF receiver for amplifying low-noise and down-converting a frequency of a received signal. However, this is only an example of the transceiver 1210 and components of the transceiver 1210 are not limited to the RF transmitter and the RF receiver.

Also, the transceiver 1210 may receive and output, to the processor 1230, a signal through a wireless channel, and transmit a signal output from the processor 1230 through the wireless channel.

The memory 1220 may store a program and data required for operations of the network entity. Also, the memory 1220 may store control information or data included in a signal obtained by the network entity. The memory 1220 may be a storage medium, such as ROM, RAM, a hard disk, a CD-ROM, and a DVD, or a combination of storage media.

The processor 1230 may control a series of processes such that the network entity operates as described above. For example, the transceiver 1210 may receive a data signal including a control signal, and the processor 1230 may determine a result of receiving the data signal.

There is provided a method for controlling an ad-hoc group communication with a security context for Mission Critical (MCX) services, wherein the method comprises sending, by a first MC service client device, an ad-hoc group communication request message to an MC service server to establish the ad-hoc group communication with at least one second MC service client device, wherein the MC service server determines whether the ad-hoc group communication is supported and successfully authorized based on the received ad-hoc group communication request, receiving, by the first MC service client device, an ad-hoc group communication request return message from the MC service server when the ad-hoc group communication is supported and successfully authorized, generating, by the first MC service client device, the security context for the at least one second MC service client device for the ad-hoc group communication: and establishing, by the first MC service client device, the ad-hoc group communication with the at least one second MC service client device using the generated security context.

The ad-hoc group communication request message comprises at least one of a list of invited second MC service client device, an encryption supported information, a list of block sharing participants associated with the at least one second MC service client device, an MC service group Identity (ID), an MC service client media parameter, an indication of an implicit floor request, a functional alias, a location information, an emergency indicator, and an imminent peril indicator.

The ad-hoc group communication request return message comprises at least one of an MC service group Identity (ID) and an authorization result information.

The security context comprises at least one of an Ad-hoc Group Communication Key (AGCK) and an Ad-hoc Group Communication Key Identifier (AGCK-ID).

Establishing, by the first MC service client device, the ad-hoc group communication with the at least one second MC service client device using the generated security context comprises sending, by the first MC service client device, the generated security context for the at least one second MC service client device to the MC service server, wherein the generated security context sent by an Ad-hoc group communication security material request and receiving, by the first MC service client device, an ad hoc group communication response from the MC service server to establish the ad-hoc group communication with the at least one second MC service client device using the generated security context.

Sending, by the first MC service client device 100, the generated security context for the at least one second MC service client device to the MC service server comprises encrypting, by the first MC service client device, the generated security context to Unique identifier (UID) associated with the at least one second MC service client device, encapsulating, by the first MC service client device, the encrypted security context for the at least one second MC service client device and sending, by the first MC service client device, the encapsulated security context for the at least one second MC service client device to the MC service server.

The method comprises determining, by the MC service server, whether the ad-hoc group communication is supported and successfully authorized based on the received ad-hoc group communication request, performing, by the MC service server, one of accepting the ad-hoc group communication request in response to determining that the ad-hoc group communication is supported and successfully authorized based on the received ad-hoc group communication request, and validating a list of invited second MC service client device based on a configured limit, or rejecting the ad-hoc group communication request in response to determining that the ad-hoc group communication is not supported by the MC service server and not successfully authorized based on the received ad-hoc group communication request.

The method comprises sending, by the MC service server, the ad-hoc group communication request message along with the generated security context to the at least one second MC service client device to notify about the ad-hoc group communication, wherein the MC service server removes a list of block sharing participants associated with the at least one second MC service client device and an MC service group Identity (ID) list of the at least one second MC service client device that requires acknowledgment, receiving, by the MC service server, an ad hoc group communication response from the at least one second MC service client device when the at least one second MC service client device accepts the ad-hoc group communication request message, wherein the ad hoc group communication response comprises a functional alias of at least one responding second MC service client device, determining, by the MC service server, whether the received ad hoc group communication response receives within a configured time, performing, by the MC service server, one of abandoning the ad-hoc group communication in response to determining that the received ad hoc group communication response does not receive within the configured time, or sending the received ad hoc group communication response to the first MC service client device to establish the ad-hoc group communication with the at least one second MC service client device using the generated security context in response to determining that the received ad hoc group communication response receives within the configured time.

The ad-hoc group communication comprises one or more preconditions wherein the MC service server authorizes the first MC service client device and the authorized first MC service client device invites the at least one second MC service client device to establish the ad-hoc group communication; wherein the at least one second MC service client device is invited for the ad-hoc group communication within limits of a non-pre-configured method, wherein the ad-hoc group communication supports end-to-end encryption, and wherein the authorized first MC service client device has the security context for the at least one second MC service client device for the ad-hoc group communication.

The method for controlling an ad-hoc group communication with a security context for Mission Critical (MCX) services, and the method comprises receiving, by an MC service server, an ad-hoc group communication request message from a first MC service client device to establish the ad-hoc group communication with at least one second MC service client device, determining, by the MC service server, whether the ad-hoc group communication is supported and successfully authorized based on the received ad-hoc group communication request, performing, by the MC service server, one of accepting the ad-hoc group communication request in response to determining that the ad-hoc group communication is supported and successfully authorized based on the received ad-hoc group communication request, and validating a list of invited second MC service client device based on a configured limit, or rejecting the ad-hoc group communication request in response to determining that the ad-hoc group communication is not supported by the MC service server and not successfully authorized based on the received ad-hoc group communication request, receiving, by the MC service server, the security context for the at least one second MC service client device for the ad-hoc group communication.

The method further comprises sending, by the MC service server, the ad-hoc group communication request message along with the generated security context to the at least one second MC service client device to notify about the ad-hoc group communication, wherein the MC service server removes a list of block sharing participants associated with the at least one second MC service client device and an MC service group Identity (ID) list of the at least one second MC service client device that requires acknowledgment, receiving, by the MC service server, an ad hoc group communication response from the at least one second MC service client device when the at least one second MC service client device accepts the ad-hoc group communication request message, wherein the ad hoc group communication response comprises a functional alias of at least one responding second MC service client device, determining, by the MC service server, whether the received ad hoc group communication response receives within a configured time, performing, by the MC service server, one of abandoning the ad-hoc group communication in response to determining that the received ad hoc group communication response does not receive within the configured time, or sending the received ad hoc group communication response to the first MC service client device to establish the ad-hoc group communication with the at least one second MC service client device using the generated security context in response to determining that the received ad hoc group communication response receives within the configured time.

There is provided a method for controlling an ad-hoc group communication with a security context for Mission Critical (MCX) services, wherein the method comprises detecting, by an MC service server, ongoing ad-hoc group communication between a first MC service client device and at least one second MC service client device receiving, by the MC service server, a modify ad-hoc group call participants request message from the first MC service client device, wherein the modify ad-hoc group call participants request message comprises a modification information, determining, by the MC service server, whether the first MC service client device is authorized to modify a participant list of the detected ongoing ad-hoc group communication, modifying, by the MC service server, the participant list based on the received modification information by performing at least one action and notifying, by the MC service server, the modified participant list of the at least one second MC service client device to at least one of the first MC service client device and the at least one second MC service client device of the modified participant list.

The modification information indicates at least one of a removal of the at least one second MC service client device from the detected ongoing ad-hoc group communication and an addition of new MC service client device into the detected ongoing ad-hoc group communication.

Modifying, by the MC service server, the participant list based on the received modification information comprises sending, by the MC service server, an ad-hoc group communication leave request to the at least one second MC service client device based on the modification information to remove the at least one second MC service client device from the detected ongoing ad-hoc group communication, receiving, by the MC service server, an ad-hoc group call leave response from at least one modified second MC service client device and removing, by the MC service server, the at least one modified second MC service client device from the detected ongoing ad-hoc group communication upon receiving the ad-hoc group call leave response.

Modifying, by the MC service server, the participant list based on the received modification information comprises sending, by the MC service server, an ad-hoc group call communication request to a new MC service client device based on the modification information to add the new MC service client device into the detected ongoing ad-hoc group communication, wherein the ad-hoc group call communication request comprises at least one of a security context for new MC service client device, an ad-hoc group identity of the detected ongoing ad-hoc group communication, and a session identity, receiving, by the MC service server, an ad-hoc group communication response from the new MC service client device and adding, by the MC service server, the new MC service client device into the detected ongoing ad-hoc group communication.

The at least one action comprises at least one of rejoining, by the MC service server, the first MC service client device in the detected ongoing ad-hoc group communication, rejoining, by the MC service server, the at least one second MC service client device in the detected ongoing ad-hoc group communication and releasing, by the MC service server, the detected ongoing ad-hoc group communication.

There is provided a first Mission Critical (MC) service client device for controlling an ad-hoc group communication with a security context for Mission Critical (MCX) services, and the first MC service client device comprises a memory, a processor and an ad-hoc group controller, operably connected to the memory and the processor, configured to send an ad-hoc group communication request message to an MC service server to establish the ad-hoc group communication with at least one second MC service client device, wherein the MC service server determines whether the ad-hoc group communication is supported and successfully authorized based on the received ad-hoc group communication request, receive an ad-hoc group communication request return message from the MC service server when the ad-hoc group communication is supported and successfully authorized, generate the security context for the at least one second MC service client device for the ad-hoc group communication and establish the ad-hoc group communication with the at least one second MC service client device using the generated security context.

There is provide a Mission Critical (MC) service server for controlling an ad-hoc group communication with a security context for Mission Critical (MCX) services, and the MC service server comprises a memory a processor and an ad-hoc group controller, operably connected to the memory and the processor, configured to receive an ad-hoc group communication request message from a first MC service client device to establish the ad-hoc group communication with at least one second MC service client device, determine whether the ad-hoc group communication is supported and successfully authorized based on the received ad-hoc group communication request, perform one of accepting the ad-hoc group communication request in response to determining that the ad-hoc group communication is supported and successfully authorized based on the received ad-hoc group communication request, and validating a list of invited second MC service client device based on a configured limit, or rejecting the ad-hoc group communication request in response to determining that the ad-hoc group communication is not supported by the MC service server and not successfully authorized based on the received ad-hoc group communication request, receiving, by the MC service server, the security context for the at least one second MC service client device for the ad-hoc group communication.

The ad-hoc group controller is configured to send the ad-hoc group communication request message along with the generated security context to the at least one second MC service client device to notify about the ad-hoc group communication, wherein the MC service server removes a list of block sharing participants associated with the at least one second MC service client device and an MC service group Identity (ID) list of the at least one second MC service client device that requires acknowledgment, receive an ad hoc group communication response from the at least one second MC service client device when the at least one second MC service client device accepts the ad-hoc group communication request message, wherein the ad hoc group communication response comprises a functional alias of at least one responding second MC service client device, determine whether the received ad hoc group communication response receives within a configured time, perform one of abandoning the ad-hoc group communication in response to determining that the received ad hoc group communication response does not receive within the configured time, or sending the received ad hoc group communication response to the first MC service client device to establish the ad-hoc group communication with the at least one second MC service client device using the generated security context in response to determining that the received ad hoc group communication response receives within the configured time.

There is provided a Mission Critical (MC) service server for controlling an ad-hoc group communication with a security context for Mission Critical (MCX) services, and the MC service server comprises a memory, a processor and an ad-hoc group controller, operably connected to the memory and the processor, configured to detect ongoing ad-hoc group communication between a first MC service client device and at least one second MC service client device, receive a modify ad-hoc group call participants request message from the first MC service client device, wherein the modify ad-hoc group call participants request message comprises a modification information, determine whether the first MC service client device is authorized to modify a participant list of the detected ongoing ad-hoc group communication, modify the participant list based on the received modification information by performing at least one action and notify the modified participant list of the at least one second MC service client device to at least one of the first MC service client device and the at least one second MC service client device of the modified participant list.

The embodiments disclosed herein can be implemented using at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

What is claimed is:

1. A method performed by a mission-critical push-to-talk (MCPTT) server in a wireless communication system, the method comprising:
receiving, from a first MCPTT device, a modify ad hoc group call participants request to remove a second MCPTT device from an ad hoc group call and to add a third MCPTT device into the ad hoc group call;
identifying whether the first MCPTT device is authorized to modify participants of the ad hoc group call;
transmitting, to the first MCPTT device, a modify ad hoc group call participants response;
transmitting, to the second MCPTT device, an ad hoc group call leave request to remove the second MCPTT device from the ad hoc group call; and
transmitting, to the third MCPTT device, an ad hoc group call request to add the third MCPTT device into the ad hoc group call.

2. The method of claim 1, further comprising:
receiving, from the second MCPTT device, an ad hoc group call leave response.

3. The method of claim 2, wherein the ad hoc group call leave response includes at least one of information on a MCPTT identification (ID) of the second MCPTT device, or information on a MCPTT ad hoc group ID.

4. The method of claim 1, wherein the ad hoc group call leave request includes at least one of information on a MCPTT identification (ID) of the second MCPTT device, or information on a MCPTT ad hoc group ID.

5. The method of claim 1, further comprising:
receiving, from the third MCPTT device, an ad hoc group call response.

6. The method of claim 5, further comprising:
transmitting, to the participants of the ad hoc group call, a notification for a change in a list of the participants.

7. The method of claim 1, wherein the modify ad hoc group call participants request includes at least one of information on a first list of MC PTT devices to be removed from the ad hoc group call, or information on a second list of MCPTT devices to be added to the ad hoc group call, and
wherein the first list includes a MCPTT ID of the second MCPTT device and the second list includes a MCPTT ID of the third MCPTT device.

8. The method of claim 1, wherein the modify ad hoc group call participants response includes at least one of information on a MCPTT identification (ID) information on a MCPTT ad hoc group ID, information on a functional alias, or information on a result of the modify ad hoc group call participants request.

9. A mission-critical push-to-talk, MCPTT, server in a wireless communication system, the MCPTT server comprising:
a transceiver; and
a controller coupled with the transceiver and configured to:
receive, from a first MCPTT device, a modify ad hoc group call participants request to remove a second MCPTT device from an ad hoc group call and to add a third MCPTT device into the ad hoc group call,
identify whether the first MCPTT device is authorized to modify participants of the ad hoc group call,
transmit, to the first MCPTT device, a modify ad hoc group call participants response,
transmit, to the second MCPTT device, an ad hoc group call leave request to remove the second MCPTT device from the ad hoc group call, and
transmit, to the third MCPTT device, an ad hoc group call request to add the third MCPTT device into the ad hoc group call.

10. The MCPTT server of claim 9, wherein the controller is further configured to:
receive, from the second MCPTT device, an ad hoc group call leave response.

11. The MCPTT server of claim 10, wherein the ad hoc group call leave response includes at least one of information on a MCPTT identification (ID) of the second MCPTT device, or information on a MCPTT ad hoc group ID.

12. The MCPTT server of claim 9, wherein the ad hoc group call leave request includes at least one of information on a MCPTT identification (ID) of the second MCPTT device, or information on a MCPTT ad hoc group ID.

13. The MCPTT server of claim 9,
wherein the controller is further configured to:
receive, from the third MCPTT device, an ad hoc group call response.

14. The MCPTT server of claim 13, wherein the controller is further configured to:
transmit, to the participants of the ad hoc group call, a notification for a change in a list of the participants.

15. The MCPTT server of claim 9, wherein the modify ad hoc group call participants request includes at least one of information on a first list of MC PTT devices to be removed from the ad hoc group call, or information on a second list of MCPTT devices to be added to the ad hoc group call, and
wherein the first list includes a MCPTT ID of the second MCPTT device and the second list includes a MCPTT ID of the third MCPTT device.

16. The MCPTT server of claim 9, wherein the modify ad hoc group call participants response includes at least one of information on a MCPTT identification (ID), information on a MCPTT ad hoc group ID, information on a functional alias, or information on a result of the modify ad hoc group call participants request.

* * * * *